(12) United States Patent
Park et al.

(10) Patent No.: US 11,899,884 B2
(45) Date of Patent: Feb. 13, 2024

(54) ELECTRONIC DEVICE AND METHOD OF RECOGNIZING A FORCE TOUCH, BY ELECTRONIC DEVICE

(71) Applicant: SAMSUNG ELECTRONICS CO., LTD., Suwon-si (KR)

(72) Inventors: Hyunbin Park, Suwon-si (KR); Junhyuk Lee, Suwon-si (KR); Jin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/965,373

(22) Filed: Oct. 13, 2022

(65) Prior Publication Data
US 2023/0084315 A1  Mar. 16, 2023

Related U.S. Application Data

(63) Continuation of application No. PCT/KR2022/013420, filed on Sep. 7, 2022.

(30) Foreign Application Priority Data

Sep. 16, 2021 (KR) .................... 10-2021-0123835

(51) Int. Cl.
*G06F 1/03* (2006.01)
*G06F 3/16* (2006.01)
(Continued)

(52) U.S. Cl.
CPC ........ *G06F 3/04186* (2019.05); *G06F 3/0446* (2019.05); *G06F 3/0488* (2013.01);
(Continued)

(58) Field of Classification Search
CPC .. G06F 3/04186; G06F 3/0446; G06F 3/0488; G06F 3/165; G06F 21/32;
(Continued)

(56) References Cited

U.S. PATENT DOCUMENTS 7,030,860 B1 * 4/2006 Hsu ..................... G06F 3/0446
345/173
8,749,507 B2   6/2014 DaCosta et al.
(Continued)

FOREIGN PATENT DOCUMENTS

KR  10-2012-0068429     6/2012
KR  10-2015-0092441     8/2015
(Continued)

OTHER PUBLICATIONS

International Search Report dated Dec. 9, 2022 in PCT Application No. PCT/KR2022/013420.
(Continued)

*Primary Examiner* — David D Davis
(74) *Attorney, Agent, or Firm* — Nixon & Vanderhye, P.C.

(57) ABSTRACT

An example electronic device may include a fingerprint sensor, a touch sensor, a memory, and a processor. The processor may be configured to determine whether a touch input is generated, determine whether the generated touch input continues for a given time or more, generate first data by accumulating the touch input generated based on the touch input continuing for the given time or more, determine whether an inputted fingerprint corresponds to a registered fingerprint of a registered user, analyze the first data using a first AI model based on the inputted fingerprint corresponding to the registered fingerprint, analyze the first data using a second AI model based on the inputted fingerprint not corresponding to the registered fingerprint, identify a form of the touch input based on the first data, and perform a function and/or execute a user interface corresponding to the identified form of the touch input.

20 Claims, 12 Drawing Sheets

(51) Int. Cl.
  *G06V 40/50* (2022.01)
  *G06V 40/13* (2022.01)
  *G06V 40/60* (2022.01)
  *G06F 3/0488* (2022.01)
  *G06F 3/044* (2006.01)
  *G06F 21/32* (2013.01)
  *G06V 40/12* (2022.01)
  *G06F 3/041* (2006.01)

(52) U.S. Cl.
  CPC .............. *G06F 3/165* (2013.01); *G06F 21/32* (2013.01); *G06V 40/1318* (2022.01); *G06V 40/1365* (2022.01); *G06V 40/50* (2022.01); *G06V 40/67* (2022.01); *G06F 2203/04105* (2013.01)

(58) Field of Classification Search
  CPC ......... G06F 2203/04105; G06F 1/1626; G06F 1/1643; G06F 1/1684; G06F 3/04817; G06F 3/0482; G06F 3/04883; G06F 3/04886; G06V 40/1318; G06V 40/1365; G06V 40/50; G06V 40/67
  See application file for complete search history.

(56) References Cited

U.S. PATENT DOCUMENTS

| | | | |
|---|---|---|---|
| 10,949,644 B2 | 3/2021 | Bach | |
| 11,216,097 B2 | 1/2022 | Roh et al. | |
| 2003/0048260 A1* | 3/2003 | Matusis | G06F 3/0481 345/173 |
| 2015/0370376 A1 | 12/2015 | Harley et al. | |
| 2018/0059893 A1 | 3/2018 | Xu et al. | |
| 2018/0150679 A1 | 5/2018 | Kim et al. | |
| 2020/0034663 A1 | 1/2020 | Michiels et al. | |
| 2020/0142582 A1 | 5/2020 | Quinn et al. | |
| 2022/0350869 A1 | 11/2022 | Progonov et al. | |

FOREIGN PATENT DOCUMENTS

| | | |
|---|---|---|
| KR | 10-1801870 | 11/2017 |
| KR | 10-2019-0079289 | 7/2019 |
| KR | 10-2020-0137450 | 12/2020 |
| KR | 10-2021-0050228 | 5/2021 |
| KR | 10-2021-0095282 | 8/2021 |
| WO | 2014/124173 | 8/2014 |

OTHER PUBLICATIONS

Written Opinion dated Dec. 9, 2022 in PCT Application No. PCT/KR2022/013420.

"Sensing Force-Based Gestures on the Pixel 4" Posted by Philip Quinn and Wenxin Feng, Research Scientists, Android UX, Jun. 24, 2020, 5 pages https://ai.googleblog.com/2020/06/sensing-force-based-gestures-on-pixel-4.html.

"Touchscreen gestures", Touchscreen gestures—Inputs—Human Interface Guidelines—Design—Apple Developer, retrieved Oct. 12, 2022, 4 pages https://developer.apple.com/design/human-interface-guidelines/ios/user-interaction/3d-touch.

"What is Apple's 3D Touch, how does it work and what iPhones is it on?" Britta O'Boyle, Deputy editor, Mar. 2022, 7 pages https://www.pocket-lint.com/phones/new/apple/135244-what-is-apple-s-3d-touch-and-how-does-it-work.

* cited by examiner

ELECTRONIC DEVICE AND METHOD OF RECOGNIZING A FORCE TOUCH, BY ELECTRONIC DEVICE

CROSS-REFERENCE TO RELATED APPLICATIONS

This application is a continuation of International Application No. PCT/KR2022/013420 designating the United States, filed on Sep. 7, 2022, in the Korean Intellectual Property Receiving Office and claiming priority to Korean Patent Application No. 10-2021-0123835, filed on Sep. 16, 2021, in the Korean Intellectual Property Office, the disclosures of which are incorporated by reference herein in their entireties.

BACKGROUND

Field

The disclosure relates to an electronic device and relates to an electronic device including a display, for example, and a method of recognizing a touch using the same.

Description of Related Art

With the development of the electronic technology, various types of electronic devices are developed and supplied. Recently, the supply of portable electronic devices having various functions, such as smartphones and tablet PCs, is expanded. In many of these portable electronic devices, detecting a touch input is used in order to support various functions. For example, the electronic device may be configured to provide a function related to an application in response to a pressure touch.

The size of display screens of electronic devices is increasing. Display screens (full front, edge-to-edge) disposed substantially in the entire area of a front surface of the electronic device have been developed. In such an electronic device, at least some existing system keys (e.g., a home key, a power key, a volume key, and a quick panel) previously implemented physically have been implemented as soft keys using a pressure sensor.

A force touch can be recognized even without additionally installing a pressure sensor on a display using deep learning. A force touch input may refer, for example, to a touch situation in which pressure is applied to a touch sensor at more than a given pressure level for more than a given time.

However, a method of recognizing a force touch using artificial intelligence (AI) may have difficulty in finding one representative AI model because touch patterns of people vary widely. For example, different patterns may be present depending on whether the force touch is provided by men, women, children, a person who presses a key in an unusual way, a person with fat fingers, etc. It may be difficult to find one AI model that represents the various patterns.

In order to address such a difficulty, recognition accuracy of a force touch input may be improved by learning touch data collected from a terminal user. In this case, however, a problem can arise in that recognition accuracy for the general public other than the terminal user is reduced because the force touch input is specialized for only a terminal user.

SUMMARY

An electronic device according to various example embodiments may include: a fingerprint sensor, a touch sensor, a memory storing at least one instruction, and a processor operatively connected to the fingerprint sensor, the touch sensor, and the memory. The processor may determine whether a touch input is generated in a fingerprint recognition area in which a fingerprint sensor is disposed using a touch sensor, may determine whether the generated touch input continues for a given time or more, may generate first data by accumulating the touch input generated based on the touch input continuing for the given time or more, may determine whether an inputted fingerprint corresponds to a registered fingerprint of a registered user by analyzing the touch input in the fingerprint recognition area, using the fingerprint sensor, may analyze the first data using a first AI model based on the inputted fingerprint corresponding to a registered fingerprint of a registered user, may analyze the first data using a second AI model based on the inputted fingerprint not corresponding to a registered fingerprint of a registered user, may identify a form of the touch input based on analysis of the first data, and may perform a function corresponding to the identified form of the touch input and/or execute a user interface corresponding to the identified form of the touch input. The first AI model may include a user-tailored AI model. The second AI model may include a common (e.g., common to multiple users) AI model. The first data may include at least any one of whether the touch input is generated, duration of the touch input, or a location on a display to which the touch input has been applied.

A method of recognizing, by an electronic device, a force touch according to various example embodiments may include: determining whether a touch input is generated in a fingerprint recognition area in which a fingerprint sensor is disposed, using a touch sensor, determining whether the generated touch input continues for a given time or more, generating first data by accumulating the touch input generated based on the touch input continuing for the given time or more, determining whether an inputted fingerprint is identical with a registered fingerprint of a registered user by analyzing the touch input in the fingerprint recognition area, using the fingerprint sensor, analyzing the first data using a first AI model based on the inputted fingerprint corresponding to a registered fingerprint of a registered user, analyzing the first data using a second AI model based on the inputted fingerprint not corresponding to a registered fingerprint of a registered user, identifying a form of the touch input based on analysis of the first data, and performing a function corresponding to the identified form of the touch input and/or executing a user interface corresponding to the identified form of the touch input. The first AI model may include a user-tailored AI model. The second AI model may include a common (e.g., common to multiple users) AI model. The first data may include at least any one of whether the touch input is generated, duration of the touch input, or a location on a display to which the touch input has been applied.

According to various example embodiments, the electronic device can select either a common AI model or a user-tailored AI model trained by user data, based on fingerprint data. The electronic device can provide optimal recognition accuracy to both the general public (e.g., multiple users) and a registered terminal user using a proper AI model.

According to various example embodiments, the electronic device can provide a differentiated user interface (UI) while operating in conjunction with a force touch. For example, the electronic device can recognize a force touch and display an interface related to volume adjustment. In this case, the electronic device can adjust volume even without pressing a physical button on the electronic device.

According to various example embodiments, the electronic device can recognize a force touch in the state in which the display has been off.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
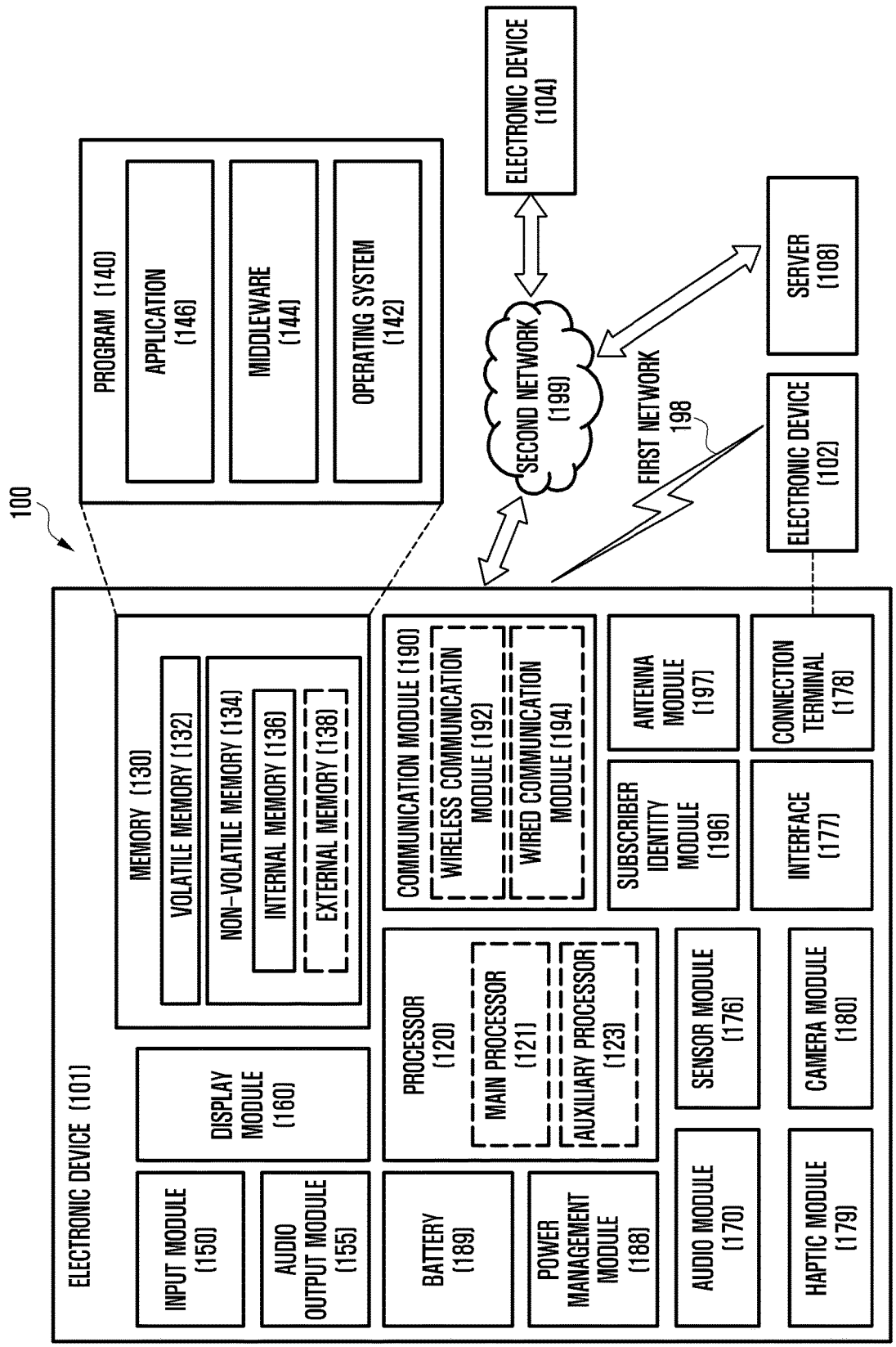
FIG. 1 is a block diagram illustrating an example electronic device within a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
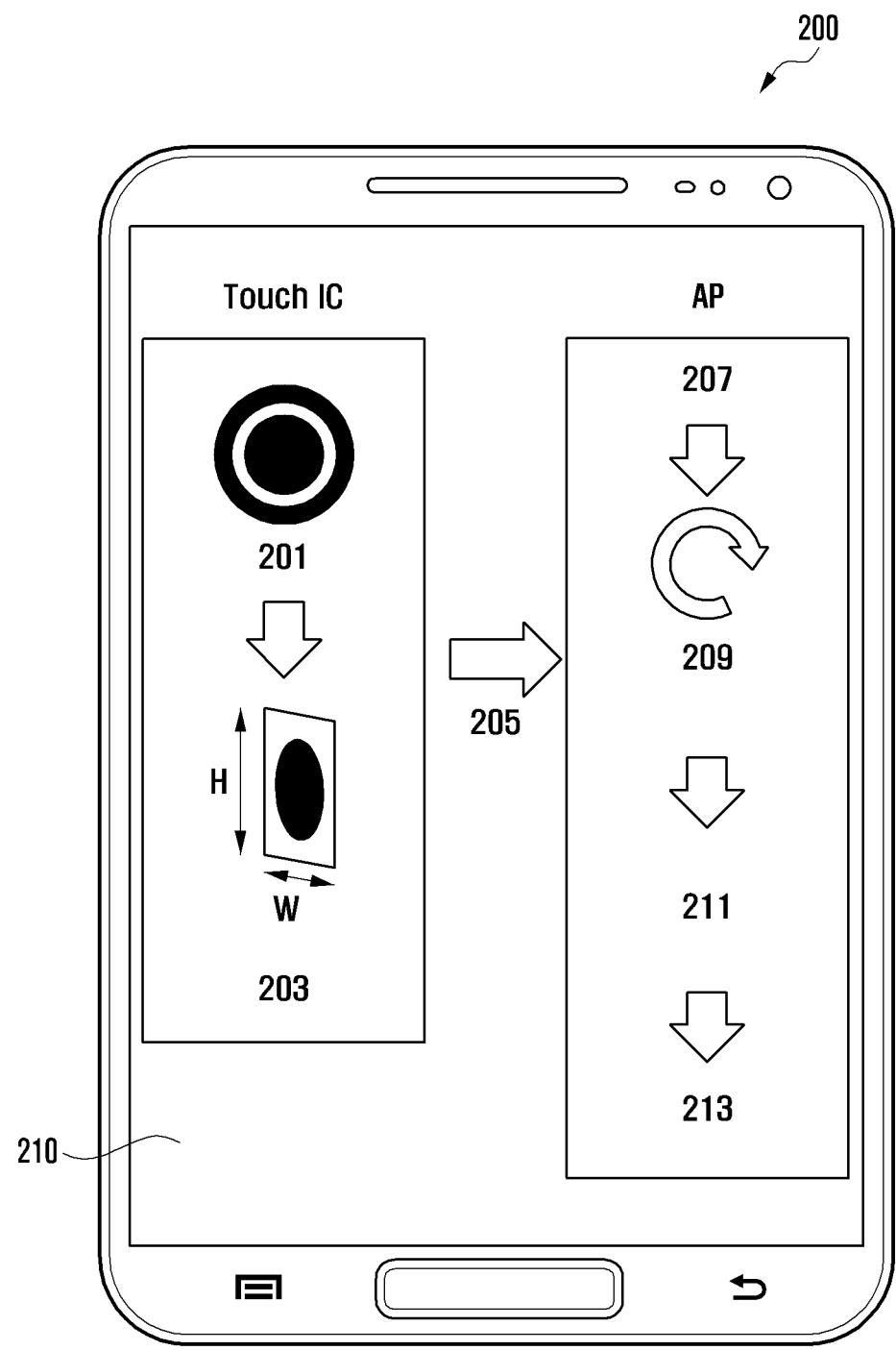
FIGS. 2A, 2B, and 2C illustrate a method of recognizing, by an electronic device, a force touch according to a comparison embodiment.
Figure 2B:
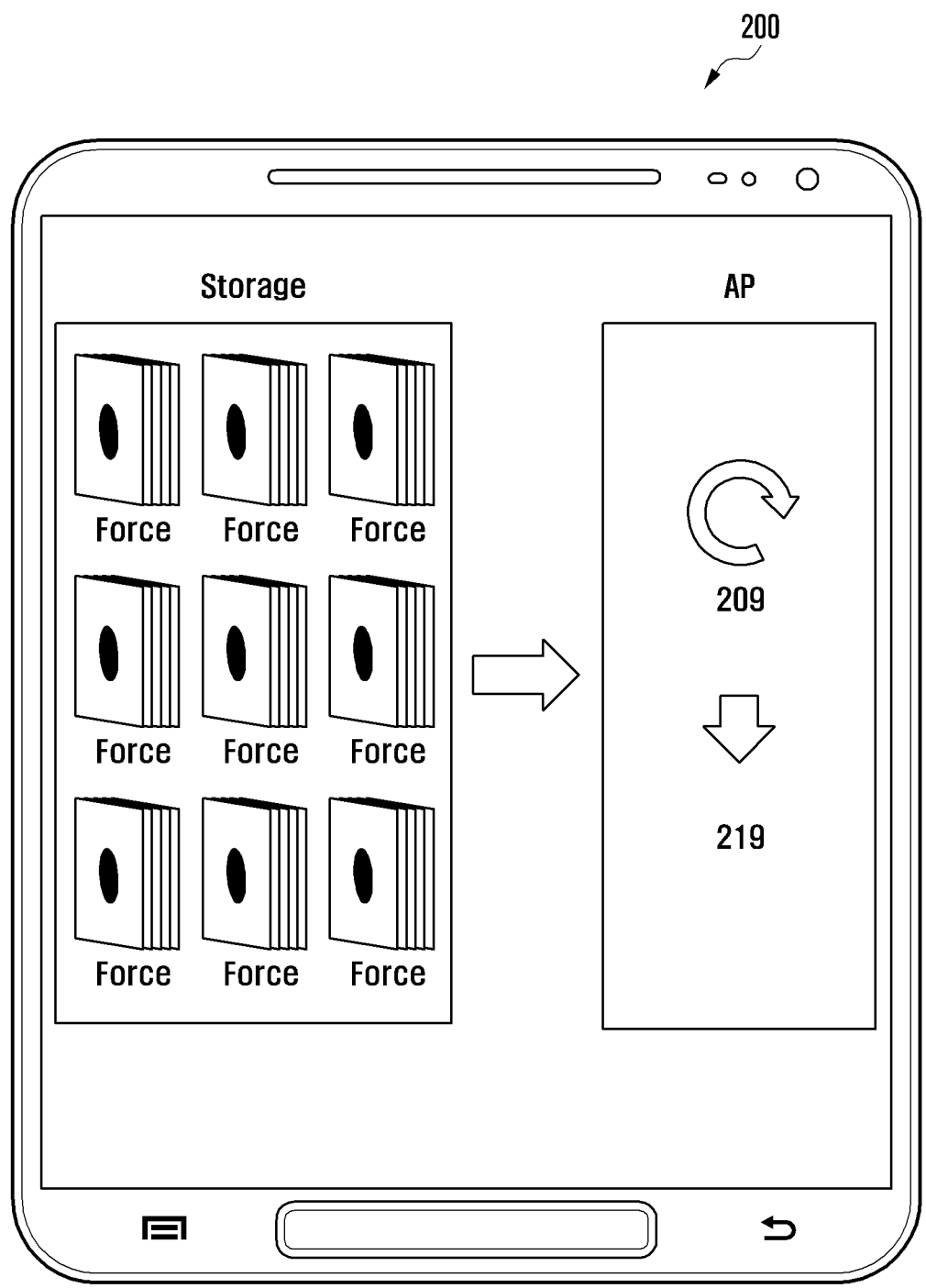
Figure 2C:
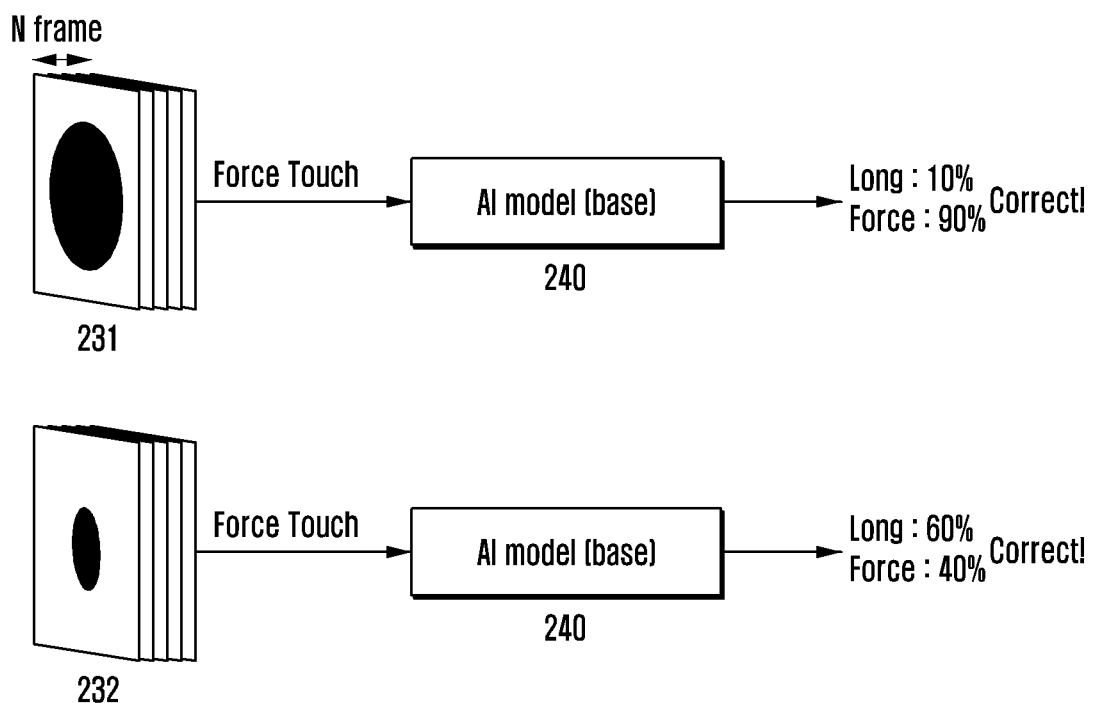

FIGS. 2A, 2B, and 2C illustrate a method of recognizing, by an electronic device, a force touch according to a comparison embodiment.

According to FIG. 2A, in operation 201, an electronic device 200 according to the comparison embodiment may recognize a touch input for a given time using a touch sensor (e.g., a touch integrated circuit (IC)). For example, the touch sensor of the electronic device 200 according to the comparison embodiment may include a part of the sensor module 176 in FIG. 1. In operation 203, the electronic device 200 according to the comparison embodiment may obtain, in a height and width unit, location data of a cell array on the display 210 to which a touch is inputted using the touch sensor. The touch sensor may accumulate the location data of such a cell array in a frame unit (e.g., an N frames for t seconds) that is generated for a given time, and may transmit the location data to a processor within the electronic device 200 in operation 205. In operation 207, the processor (e.g., an application processor) within the electronic device 200 may receive the data having the height, width, and frame unit. The processor within the electronic device 200 may analyze the received data using an AI model in operation 209, and may identify whether the touch input is a long touch input or a force touch input in operation 211.

Hereinafter, the long touch input may refer, for example, to a situation in which pressure is applied to the touch sensor for more than a given time. A force touch input may refer, for example, to a situation in which pressure is strongly applied to the touch sensor at more than a given pressure level for more than a given time.

In operation 213, the electronic device 200 according to the comparison embodiment may perform a related function or output a pre-configured user interface based on the type of touch input.

FIG. 2B illustrates a process of performing, by the electronic device 200, deep learning using an AI model according to the comparison embodiment.

According to FIG. 2B, in operation 209, the electronic device 200 according to the comparison embodiment may analyze received data (e.g., a height, a width, and touch input data of a frame unit) using an AI model. For example, the received data input from the storage to the application processor may be input data based on a force touch. Thereafter, in operation 219, the electronic device 200 may perform learning using the AI model and collected data. The electronic device 200 may more accurately recognize a touch input of a user by learning user data, and may accurately identify the type of touch (e.g., a long touch or a force touch).

FIG. 2C illustrates a limit of the method of recognizing, by the electronic device 200, a force touch according to the comparison embodiment.

In operation 209, the electronic device 200 according to the comparison embodiment may analyze received data (e.g., a height, a width, and touch input data of a frame unit) using an AI model. However, the electronic device 200 may have a difficulty finding an AI model that represents such a touch pattern because touch patterns of common users vary. That is, the electronic device 200 may receive various touch patterns of men, women, children, a person with large fingers, a person who performs a touch in an unusual way, a person who has strong pressure to press a touch sensor, etc.

For example, if a first user 231 applies a touch input for an N frame, an AI model 240 may recognize the touch input and may identify the type of touch according to a touch probability based on a touch input time and form. The AI model 240 may, for example, calculate the probability that the touch input is a long touch input as 10% and the probability that the touch input is a force touch input as 90% by analyzing the touch input of the first user 231, and may classify the touch input of the first user 231 as a force touch input. Alternatively, the AI model 240 may, for example, calculate the probability that the touch input is a long touch input as 60% and the probability that the touch input is a force touch input as 40% by analyzing the touch input of the second user 232, and may identify that the touch input of the second user 232 is not a force touch input. However, second user 232 may be a relatively weak person. Although the second user 232 has intended a force touch input, the electronic device 200 may erroneously determine that a touch input of the second user 232 is not a force touch input by applying the same criterion (or criteria) as that of the first user 231.

Since various touch input patterns may be generated for each user, the electronic device 200 may use a user-tailored AI model as in Table 235 in order to solve such a problem. That is, a user-tailored AI model (AI model user) on the lower side of Table 235 may raise the accuracy of the recognition of a touch input operation by the electronic device 200 from 80% to 92% compared to a common AI model (AI model base). However, such a user-tailored AI model (AI model user) is suitably learned for a registered user and increases the accuracy of touch input recognition for the registered user, but may have a problem in that the accuracy of touch input recognition for a not-registered common user is decreased (e.g., from 90% to 85%).

Hereinafter, an example electronic device 300 for improving touch input recognition accuracy and a method of recognizing, by the electronic device 300, a force touch will be described with reference to FIGS. 3, 4, 5, 6, 7A, and 7B.

Figure 3:
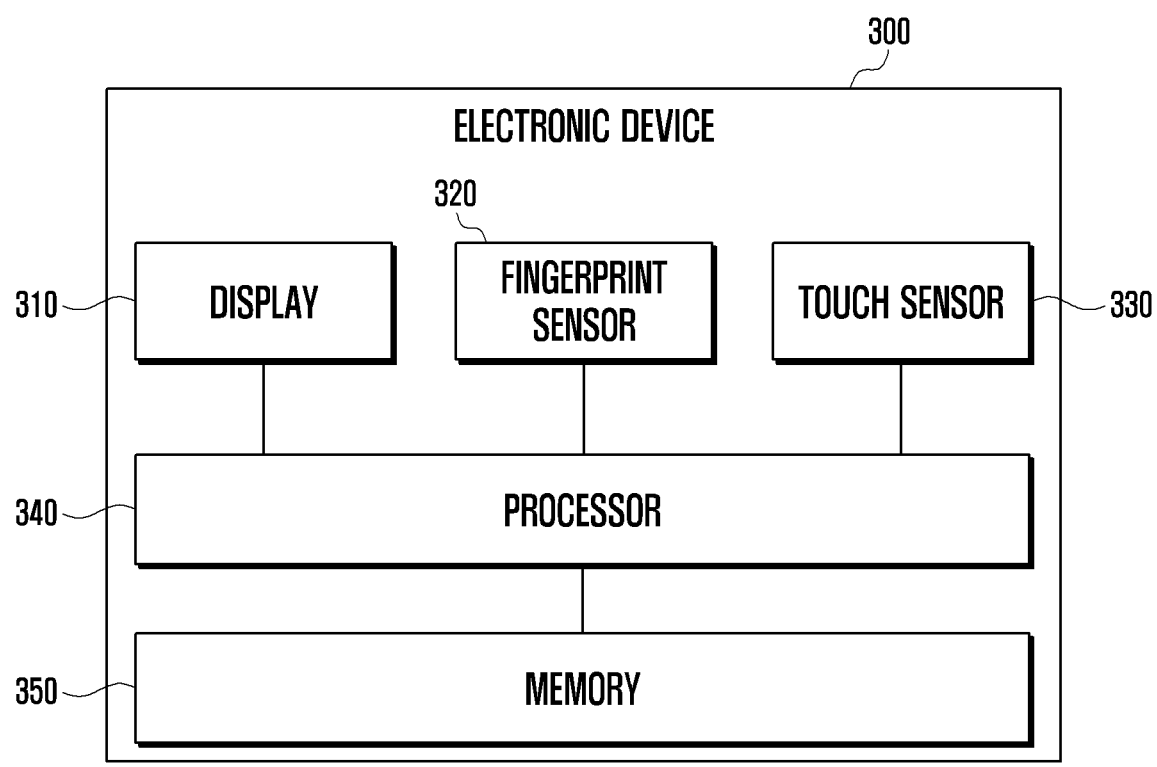
FIG. 3 illustrates, as a block diagram, a construction of an example electronic device according to various embodiments.

FIG. 3 illustrates, as a block diagram, a construction of an example electronic device according to various embodiments.

According to various embodiments, an electronic device 300 includes a display 310, a fingerprint sensor 320, a touch sensor 330, a processor 340 and/or a memory 350. Even if some of the illustrated components are omitted or substituted, various embodiments of this disclosure can be implemented. Furthermore, the electronic device 300 may include at least some of the components and/or functions of the electronic device 101 in FIG. 1.

According to various embodiments, the display 310 displays an image, and may be implemented as any one of a liquid crystal display (LCD), a light-emitting diode (LED) display, an organic light-emitting diode (OLED) display, a micro electro mechanical system (MEMS) display, or an electronic paper display, but the disclosure is not limited thereto. The display 310 may include at least some of the components and/or functions of the display module 160 in FIG. 1.

According to various embodiments, the electronic device 300 may recognize a force touch using the fingerprint sensor 320, even in a state in which the display 310 is off.

According to various embodiments, the fingerprint sensor 320 may obtain fingerprint information of a user. The fingerprint sensor 320 may be implemented as an optical fingerprint sensor capable of obtaining a fingerprint image, but the disclosure is not limited thereto. The fingerprint information obtained by the fingerprint sensor 320 may be stored as image information, and may be used by the electronic device 300 to authenticate a user through a comparison with pre-registered fingerprint information. The fingerprint sensor 320 may be formed in at least one area on a back surface of the display 310 or within the display 310. Accordingly, when a touch input using a finger of a user is generated on a cover window of the display 310, the touch sensor 330 may obtain touch information, and the fingerprint sensor 320 may obtain fingerprint information simultaneously with at least some of the acquisition of the touch information.

According to an embodiment, the fingerprint sensor 320 may obtain fingerprint information using light emitted from the display 310. The display 310 may function as a light source for operation of the fingerprint sensor 320.

According to an embodiment, the fingerprint sensor 320 may, for example, include a CMOS image sensor (CIS), a charge coupled device (CCD) image sensor, a TFT amorphous silicon image sensor, or an organic photodiode (OPD).

According to an embodiment, the fingerprint sensor 320 may include at least one lens. The lens disposed in the fingerprint sensor 320 may include a lens type whose lens magnification is substantially smaller than one (e.g., ¼ to ⅐) or may be a lensless type in which a lens is not present or a micro lens, a pin-hole array, or an optical fiber is used and whose lens magnification is substantially close to one.

According to an embodiment, the fingerprint sensor 320 may be activated when a fingerprint recognition function is activated, for example, when an unlocking operation or an application for which security has been configured, such as a message application, is executed. According to an embodiment, the fingerprint sensor 320 may be activated when the fingerprint recognition function is activated and a touch input is generated in an area of the fingerprint sensor 320.

According to an embodiment, the electronic device 300 according to this disclosure uses an optical fingerprint sensor, and may basically use the display 310 as one form of a light source (not illustrated). Hereinafter, a case in which light emitted from the display 310 is used as one form of a light source (not illustrated) will be described as the electronic device 300 using the optical fingerprint sensor, but the light source (not illustrated) may be separately disposed within the electronic device 300.

According to various embodiments, the touch sensor 330 may detect a user input and/or a touch input detected from the outside of a housing (not illustrated), and may transmit the user input and/or the touch input to the processor 340. The touch sensor 330 may generate an electrical signal by detecting a capacitance change, and may transmit the electrical signal to the processor 340. The electronic device 300 may receive a touch input through the touch sensor 330 under the control of the processor 340.

According to various embodiments, when receiving a touch input, the touch sensor 330 may detect capacitance and/or a capacitance change and change the capacitance and/or the capacitance change into an electrical signal. For example, the electrical signal may be a signal having a voltage and/or current unit. The touch sensor 330 may further include an analog-digital converter (ADC) (not illustrated) for detecting capacitance and/or a capacitance change and converting the capacitance and/or the capacitance change into an electrical signal. Based on the electrical signal obtained by the touch sensor 330, the touch sensor 330 may generate touch data using the ADC. For example, the touch data generated based on the electrical signal may mean data having a number form, may mean "open" or no touch when the touch data is 0, and may mean "short" or a touch state when the touch data is 1.

The electronic device 300 may transmit touch data from the touch sensor 330 to the memory 350 under the control of the processor 340. The electronic device 300 may store touch data in the memory 350 under the control of the processor 340.

In various embodiments, the electronic device 300 may determine whether a touch input is received based on touch data stored in the memory 350 under the control of the processor 340. For example, when touch data has a given value or more, the electronic device 300 may determine that a touch input is present.

According to various embodiments, the processor 340 is a component capable of performing an operation or data processing regarding control and/or communication of each component of the electronic device 300, and may include at least some of the components of the processor 120 in FIG. 1. The processor 340 may be electrically connected to internal components of the electronic device 300, including the display 310, the fingerprint sensor 320, the touch sensor 330 and/or the memory 350.

According to various embodiments, the processor 340 may determine whether a touch input is generated in a fingerprint recognition area in which the fingerprint sensor 320 is disposed using the touch sensor 330, may determine whether the generated touch input continues for a given time or more, and may generate first data by accumulating the touch input generated for the corresponding time when the touch input continues for the given time or more. The processor 340 may determine whether an inputted fingerprint is identical with a registered fingerprint of a user by analyzing the touch input in the fingerprint recognition area using the fingerprint sensor 320, may analyze the first data using a user-tailored AI model when the inputted fingerprint is identical with the fingerprint of the user, and may analyze the first data using a common AI model when the inputted fingerprint is not identical with the fingerprint of the user. The processor 340 may identify a form of the touch input based on a result of the analysis of the first data, and may perform a function corresponding to the form of the touch input and/or execute a user interface corresponding to the form of the touch input.

In an embodiment, the processor 340 may include the main processor 121 (e.g., a central processing unit or an application processor) in FIG. 1 or the coprocessor 123 (e.g., a graphic processor, a neural processing unit (NPU), an image signal processor, a sensor hub processor, or a communication processor) in FIG. 1, which may be operated independently of or along with the main processor 121. For example, if the electronic device 300 includes the main processor 121 and the coprocessor 123, the coprocessor 123 may use lower power than the main processor 121 or may be configured to be specialized for a designated function. The coprocessor 123 may be implemented separately from the main processor 121 or as a part thereof.

In an embodiment, the coprocessor 123 may analyze collected data using an AI model. For example, as in operation 209 of FIG. 2, the coprocessor 123 may analyze received data (e.g., a height, a width, and touch input data of a frame unit) using an AI model.

In an embodiment, the processor 340 may supply a driving signal for fingerprint sensing using at least some of a plurality of pixels of the display 310. The driving signal may be provided so that at least some of the plurality of pixels of the display 310 emit light and operate as a light source for the fingerprint sensor 320.

The memory 350 is for temporarily or permanently storing digital data, and may include at least one of the components of the memory 130 in FIG. 1. The memory 350 may include a volatile memory and a nonvolatile memory. The nonvolatile memory may include at least one of a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive, or a solid state drive (solid state drive (SSD)). The volatile memory may include at least one of a dynamic RAM (DRAM), a static (SRAM RAM), or a synchronous dynamic RAM (SDRAM).

The memory 350 may store various instructions which may be executed by the processor 340. Such instructions may include control commands for arithmetic and logic operations, a data movement, and/or input and output, which may be recognized by the processor 340, and may be defined on a framework stored in the memory 350.

According to an embodiment, the memory 350 may include a register(s) (not illustrated). The register(s) may record an image of detected reflected light when a designated light source (e.g., at least some of the plurality of pixels) is turned on. The processor 340 may control an operation of the designated light source and an operation of the fingerprint sensor 320 to be synchronized with each other, may receive a stored value from the register(s), and may re-construct a fingerprint image through an image processing process.

According to an embodiment, the memory 350 may store user data related to a registered fingerprint of a user through a fingerprint registration operation. For example, the user data may be stored in a security area of the memory 350.

According to various embodiments, an operation and a data processing function which may be implemented within the electronic device 300 by the processor 340 is not limited. However, hereinafter, according to various embodiments of this disclosure, an operation for selecting a deep learning model optimized for a user using fingerprint information in order to increase a recognition ratio of an AI force touch is more specifically described. Operations of the processor 340 to be described below may be performed by loading the aforementioned instructions stored in the memory 350.

Figure 4:
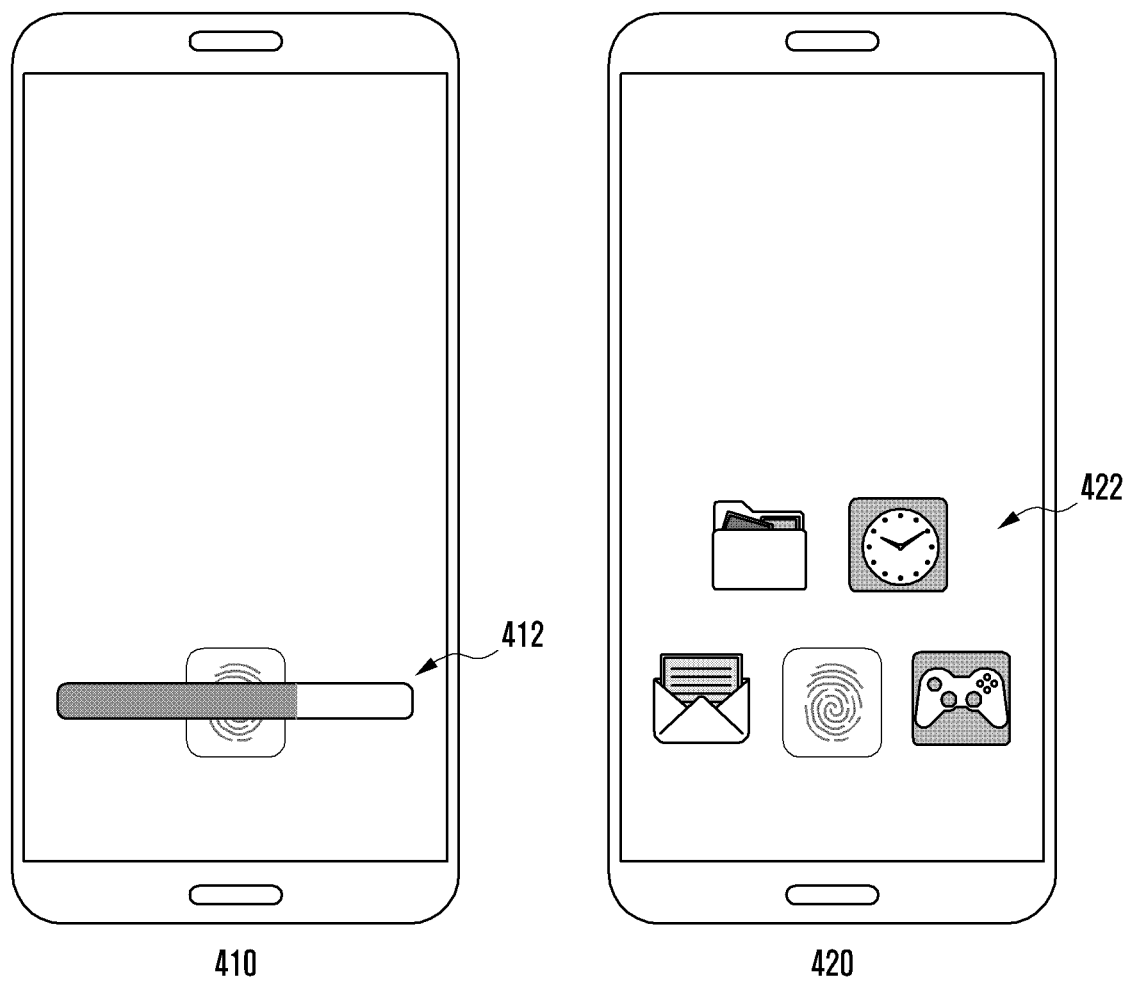
FIG. 4 illustrates an operation of performing, by an example electronic device, a corresponding function when the electronic device recognizes a force touch input according to various embodiments.

FIG. 4 illustrates an operation of performing, by an example electronic device, a corresponding function in which the electronic device recognizes a force touch input according to various embodiments.

According to various embodiments, an electronic device (e.g., the electronic device 300 in FIG. 3) may identify a form of a touch input based on a result of the analysis of first data, and may perform a function corresponding to the form of the touch input and/or execute a user interface corresponding to the form of the touch input. The first data may refer, for example, to data generated by accumulating the touch input detected by a touch sensor (e.g., the touch sensor 330 in FIG. 3) for a given time. Furthermore, the first data may include at least any one of a time, strength, pressure, intensity, and a touch form of the touch input.

According to an embodiment, if it is determined that the form of the touch input is the force touch input, the electronic device 300 may display, on a display (e.g., the display 310 in FIG. 3), an interface 412 capable of adjusting volume. A screen 410 of FIG. 4 illustrates a situation in which the interface 412 capable of adjusting volume is displayed on the electronic device 300. The electronic device 300 may recognize a force touch input, may provide a user with the interface 412 capable of adjusting volume, and may perform control so that the user conveniently adjusts the volume even without using a button key in the electronic device 300. The interface which may be provided by the electronic device 300 upon force touch input is not limited to the interface 412 capable of adjusting volume. For example, the electronic device 300 may provide various interfaces including a brightness adjustment interface or an interface for executing a specific application.

According to an embodiment, if it is determined that a form of a touch input is a force touch input, the electronic device 300 may control a specific application to be executed. For example, the electronic device 300 may control at least any one of a camera application, a gallery application, a pay application, a note application, or a voice assistant application to be executed after recognizing a force touch input. Alternatively, the electronic device 300 may control the display 310 to be expanded or reduced after recognizing a force touch input even in a state in which the display 310 is off. The type of application or operation which may be executed by the electronic device 300 after recognizing a force touch input is not limited to the above examples.

According to an embodiment, if it is determined that a form of a touch input is a force touch input, when an inputted fingerprint is identical with a fingerprint of a user, the electronic device 300 may display, on the display 310, a guide screen that inquires about security unlocking and an icon of an application that is frequently used by the user with more than some specified frequency. When the inputted fingerprint is not identical with the fingerprint of the user, the electronic device 300 may display a guide indicating that the fingerprints are not identical with each other, and may operate the display 310.

A screen 420 of FIG. 4 illustrates a situation in which a fingerprint recognition area and an icon(s) 422 of an application(s) that is frequently used by a user with more than given frequency are displayed on the electronic device 300. The electronic device 300 may provide guidance of an icon that is frequently used by a user by recognizing a force touch input, and may execute a specific application based on an input of the user. The electronic device 300 may perform control so that a user can conveniently and quickly perform a specific application even without experiencing a lock screen unlocking and home screen display process by providing guidance of an icon that is frequently used by the user. An interface which may be provided by the electronic device 300 upon force touch input may not be limited to an icon that is frequently used by a user. For example, the electronic device 300 may display a guide screen for an icon of an application to be displayed for a user upon force touch input, and may display an icon of a specific application based on the selection of the user when recognizing the force touch input. Furthermore, the number of icons of applications which may be displayed in the electronic device 300 is not limited, and may be different depending on a user configuration.

Figure 5:
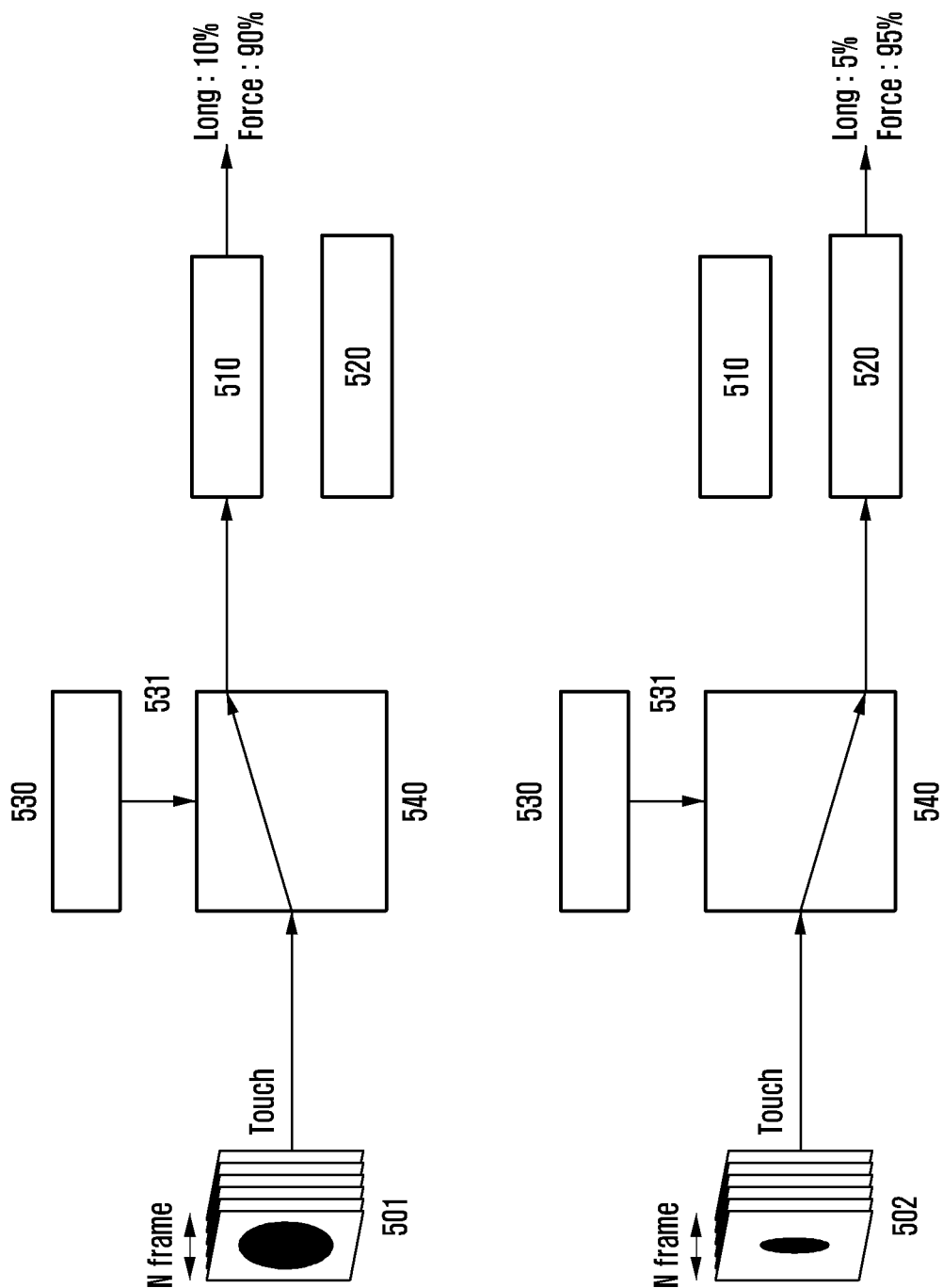
FIG. 5 illustrates an operation of selecting, by an example electronic device, an AI model for analyzing data according to various embodiments.

FIG. 5 illustrates an operation of selecting, by an example electronic device, an AI model for analyzing data according to various embodiments.

According to various embodiments, an electronic device (e.g., the electronic device 300 in FIG. 3) may determine whether an inputted fingerprint is identical with a registered fingerprint of a user by analyzing a touch input in a fingerprint recognition area using a fingerprint sensor (e.g., the fingerprint sensor 320 in FIG. 3), may analyze first data using a user-tailored AI model 520 when the inputted fingerprint is identical with the fingerprint of the user, and may analyze the first data using a common AI model 510 when the inputted fingerprint is not identical with the fingerprint of the user. The first data may refer, for example, to data generated by accumulating the touch input detected by a touch sensor (e.g., the touch sensor 330 in FIG. 3) for a given time. Furthermore, the first data may include at least any one of a time, strength, pressure, intensity, and a touch form of the touch input.

According to an embodiment, the electronic device 300 may recognize a force touch input only in a fingerprint recognition area in which the fingerprint sensor 320 is disposed. If a long touch input or a force touch input is able to be recognized in the entire area of a display (e.g., the display 310 in FIG. 3), the display 310 may operate regardless of a user's intention when a finger of the user is placed on the display 310. For this reason, the electronic device 200 according to the comparison embodiment may recognize a long touch input in an area in which fingerprint recognition is possible, and may execute a security release interface according to the long touch input. The electronic device 300 according to various embodiments of this disclosure may recognize a force touch input only in an area in which fingerprint recognition is possible for the same reason as that of the long touch input. Furthermore, the electronic device 300 may recognize a force touch input using the fingerprint sensor 320 even in a situation in which the display 310 has been off, and may provide a differentiated interface according to the force touch input.

The electronic device 300 may recognize a touch input of a common user 501 for a given time (e.g., an N frame) using a touch sensor (e.g., the touch sensor 330 in FIG. 3). A user determination unit 530 in a processor (e.g., the processor 340 in FIG. 3) may recognize a fingerprint on the inputted touch using a fingerprint sensor (e.g., the fingerprint sensor 320 in FIG. 3), and may determine whether the inputted touch is made by a registered (e.g., known) user by comparing the recognized fingerprint with a fingerprint of the user previously stored in a memory (e.g., the memory 350 in FIG. 3). If the inputted touch is not made by the registered user, an AI model selection unit 540 in the processor 340 may select the common AI model 510. Thereafter, the processor 340 may load data related to the common AI model 510 from the memory 350. The processor 340 may analyze the touch input based on the loaded data, and may determine whether a form of the touch input is a long touch input or a force touch input. As described with reference to FIG. 2A, the long touch input may refer, for example, to a situation in which pressure is applied to the touch sensor for more than a given time. Furthermore, the force touch input may refer, for example, to a situation in which pressure is strongly applied to the touch sensor at more than a given pressure level for more than a given time.

The electronic device 300 may recognize a touch input of a registered user 502 for a given time (e.g., N frame(s)) using the touch sensor 330. The user determination unit 530 in a processor (e.g., the processor 340 in FIG. 3) may recognize a fingerprint on the inputted touch using a fingerprint sensor (e.g., the fingerprint sensor 320 in FIG. 3), and may determine whether the inputted touch is made by the registered user by comparing the recognized fingerprint with a fingerprint of the user previously stored in a memory (e.g., the memory 350 in FIG. 3). If the inputted touch has been generated by the registered user, the AI model selection unit 540 in the processor 340 may select the user-tailored AI model 520. Thereafter, the processor 340 may load data related to the user-tailored AI model 520 from the memory 350. The processor 340 may analyze the touch input based on the loaded data, and may determine whether a form of the touch input is a long touch input or a force touch input.

Figure 6:
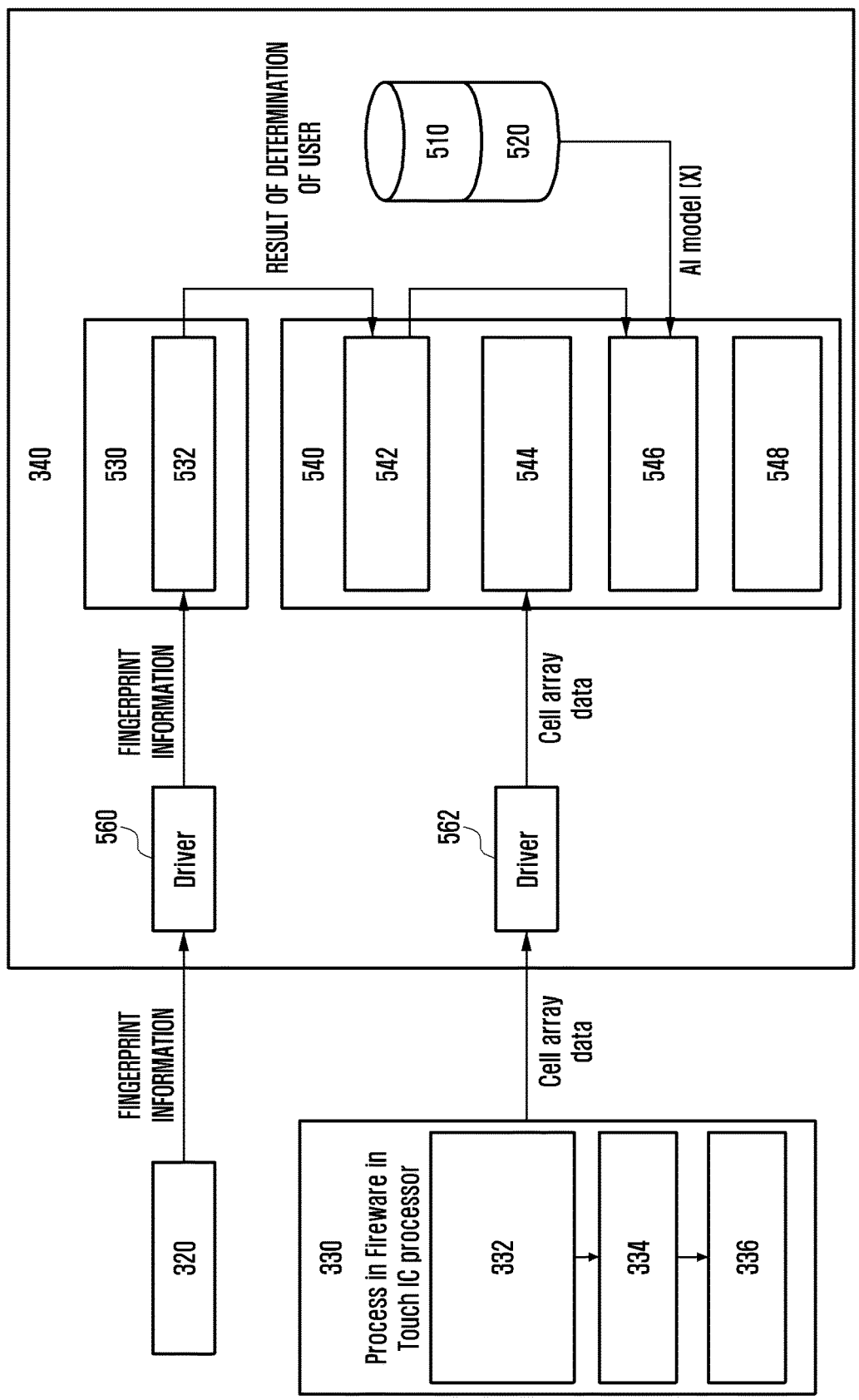
FIG. 6 illustrates, for each operation, a method of recognizing, by an example electronic device, a force touch according to various embodiments.

FIG. 6 illustrates, for each operation, a method of recognizing, by an example electronic device, a force touch according to various embodiments.

According to various embodiments, an electronic device (e.g., the electronic device 300 in FIG. 3) may include a display (e.g., 310 in FIG. 3), a fingerprint sensor (e.g., 320 in FIG. 3), a touch sensor (e.g., 330 in FIG. 3), a processor (e.g., 340 in FIG. 3) and/or a memory (e.g., 350 in FIG. 3).

According to various embodiments, the fingerprint sensor 320 may obtain fingerprint information of a user. The fingerprint information obtained by the fingerprint sensor 320 may be stored as image information, and may be used for the authentication of the electronic device 300 through a comparison with pre-registered fingerprint information. The fingerprint sensor 320 may be formed in at least one area of a back surface of the display 310 or within the display 310.

Accordingly, when a touch input using a finger of a user is generated on a cover window of the display 310, the touch sensor 330 may obtain touch information, and the fingerprint sensor 320 may obtain fingerprint information simultaneously with at least some of the acquisition of the touch information. The fingerprint sensor 320 may transmit obtained fingerprint information to the processor 340 via driver 560.

According to an embodiment, the user determination unit 530 in the processor 340 may recognize a fingerprint on an inputted touch using the fingerprint sensor 320, and may determine whether the inputted touch is made by a registered user by comparing the recognized fingerprint with a fingerprint of a registered user(s) previously stored in the memory 350 in operation 532. If the inputted touch is not made by a registered user, in operation 542, the AI model selection unit 540 in the processor 340 may select the common AI model 510. Thereafter, the processor 340 may load data related to the common AI model 510 from the memory 350. The processor 340 may analyze the touch input based on the loaded data, and may determine whether a form of the touch input is a long touch input or a force touch input. As described with reference to FIG. 2A, the long touch input may refer, for example, to a situation in which pressure is applied to the touch sensor for more than a given time. Furthermore, the force touch input may refer, for example, to a situation in which pressure is strongly applied to the touch sensor at more than a given pressure level for more than a given time.

Alternatively, if the inputted touch has been generated by a registered user, in operation 542, the AI model selection unit 540 in the processor 340 may select the user-tailored AI model 520. Thereafter, the processor 340 may load data related to the user-tailored AI model 520 from the memory 350. The processor 340 may analyze the touch input based on the loaded data, and may determine whether a form of the touch input is a long touch input or a force touch input.

In operation 332, the processor 340 may determine whether an input is present within a fingerprint recognition area range of the fingerprint sensor 320 using a touch sensor (e.g., the touch sensor 330 in FIG. 3). Thereafter, when the input is present within the fingerprint recognition area range, in operation 334, the processor 340 may determine whether a form of the input is a touch form. The electronic device 300 may indicate, in a height and width unit, a location of a cell array of the display 310 to which a touch is inputted. The touch form may refer, for example, to a form of a distribution of locations of the cell array to which a touch is inputted. Thereafter, in operation 336, the processor 340 may recognize duration of the touch input using the touch sensor 330. The touch sensor 330 may accumulate location data of the cell array in a frame unit (e.g., an N frame for t seconds) in which the location data is generated for a given time, and may transmit the location data to the processor 340.

In operation 544, the processor 340 may receive, from the touch sensor 330 via driver 562, first data in which the location data of the cell array has been accumulated and combined in a frame unit (e.g., an N frame for t seconds) generated for the given time. The first data may refer, for example, to data generated by accumulating the touch input detected by a touch sensor (e.g., the touch sensor 330 in FIG. 3) for the given time. Furthermore, the first data may include at least any one of a time, strength, pressure, intensity, and a touch form of the touch input. Operation 544 will be described below with reference to FIG. 7B.

In operation 546, the processor 340 may analyze the received first data using a selected AI model (e.g., the common AI model 510 or the user-tailored AI model 520). The processor 340 may determine whether a form of the touch input is a long touch input or a force touch input using the AI model. As described with reference to FIG. 2A, the long touch input may refer, for example, to a situation in which pressure is applied to the touch sensor for more than a given time. Furthermore, the force touch input may refer, for example, to a situation in which pressure is strongly applied to the touch sensor at more than a given pressure level for more than a given time.

In operation 548, the processor 340 may perform a function corresponding to the form of the touch input and/or execute a user interface corresponding to the form of the touch input. According to an embodiment, if it is determined that the form of the touch input is the force touch input, the electronic device 300 may display, on the display 310, an interface (e.g., 412 in FIG. 4) capable of adjusting volume. According to an embodiment, if it is determined that the form of the touch input is the force touch input, the electronic device 300 may display, on the display 310, a guide screen that inquires about security unlocking and an icon of an application(s) that is frequently used by the user with more than given frequency when the inputted fingerprint is identical with a fingerprint of the user, and may display, on the display 310, a guide indicating that the fingerprints are not identical with each other when the inputted fingerprint is not identical with the fingerprint of the user, and may operate the display 310.

The electronic device 300 according to various embodiments may include the fingerprint sensor 320, the touch sensor 330, the memory 350 storing at least one instruction, and the processor 340 operatively connected to the fingerprint sensor 320, the touch sensor 330, and the memory 350. The processor 340 may determine whether a touch input is generated in a fingerprint recognition area in which the fingerprint sensor 320 is disposed using the touch sensor 330, may determine whether the generated touch input continues for a given time or more, may generate first data by accumulating the touch input generated for the corresponding time when the touch input continues for the given time or more, may determine whether an inputted fingerprint is identical with a registered fingerprint of a user by analyzing the touch input in the fingerprint recognition area using the fingerprint sensor 320, may analyze the first data using a first AI model when the inputted fingerprint is identical with the fingerprint of the user, may analyze the first data using a second AI model when the inputted fingerprint is not identical with the fingerprint of the user, may identify a form of the touch input based on a result of the analysis of the first data, and may perform a function corresponding to the form of the touch input and/or execute a user interface corresponding to the form of the touch input. The first AI model may include a user-tailored AI model. The second AI model may include a common (e.g., common to multiple users) AI model. The first data may include at least any one of whether the touch input is generated, duration of the touch input, or a location on the display to which the touch input has been applied.

According to an embodiment, the form of the touch input may include a long touch input to touch the display for an input time more than a given time, but with strength of an input less than a certain level, and a force touch input to touch the display for an input time more than a given time and with strength of an input more than a certain level.

According to an embodiment, the processor may recognize the force touch input only in the fingerprint recognition area in which the fingerprint sensor is disposed.

According to an embodiment, if it is determined that the form of the touch input is the long touch input, the processor may release a security lock and operate the display when the inputted fingerprint is identical with the fingerprint of the user, and may display a guide indicating that the fingerprints are not identical with each other and operate the display when the inputted fingerprint is not identical with the fingerprint of the user.

According to an embodiment, if it is determined that the form of the touch input is the force touch input, the processor may display, on the display, at least any one of a guide screen that inquires about security unlocking, an icon of an application(s) that is frequently used by the user with more than given frequency, or an icon of an application(s) configured by the user when the inputted fingerprint is identical with the fingerprint of the user, and may display a guide indicating that the fingerprints are not identical with each other and operate the display when the inputted fingerprint is not identical with the fingerprint of the user.

According to an embodiment, if it is determined that the form of the touch input is the force touch input, the processor may display, on the display, an interface capable of adjusting volume.

According to an embodiment, the first AI model may determine whether the touch input is a touch input of a user registered in the electronic device using the fingerprint sensor, may store, in the memory, data related to the touch input of the user registered in the electronic device when the touch input corresponds to the touch input of the user registered in the electronic device, and may learn a registered user pattern including at least any one of strength, a touch form, or a touched range upon touch input of the configured user using the stored data.

According to an embodiment, the second AI model may determine whether the touch input is a touch input of a user registered in the electronic device using the fingerprint sensor, and when the touch input is not the touch input of a registered user of the electronic device, may classify the touch input as a touch input of a common user, store, in the memory, data related to the touch input of the common user, and learn a common user pattern including at least any one of strength, a touch form, or a touched range upon touch input of the common user using the stored data.

According to an embodiment, when a touch is inputted to a cell array of the touch sensor, the touch sensor may generate location data including transverse and longitudinal locations of a cell to which a touch input is applied. The first data may include data generated by accumulating the location data for a given time for which the touch input is applied.

According to an embodiment, the processor may receive the first data from the touch sensor.

Figure 7A:
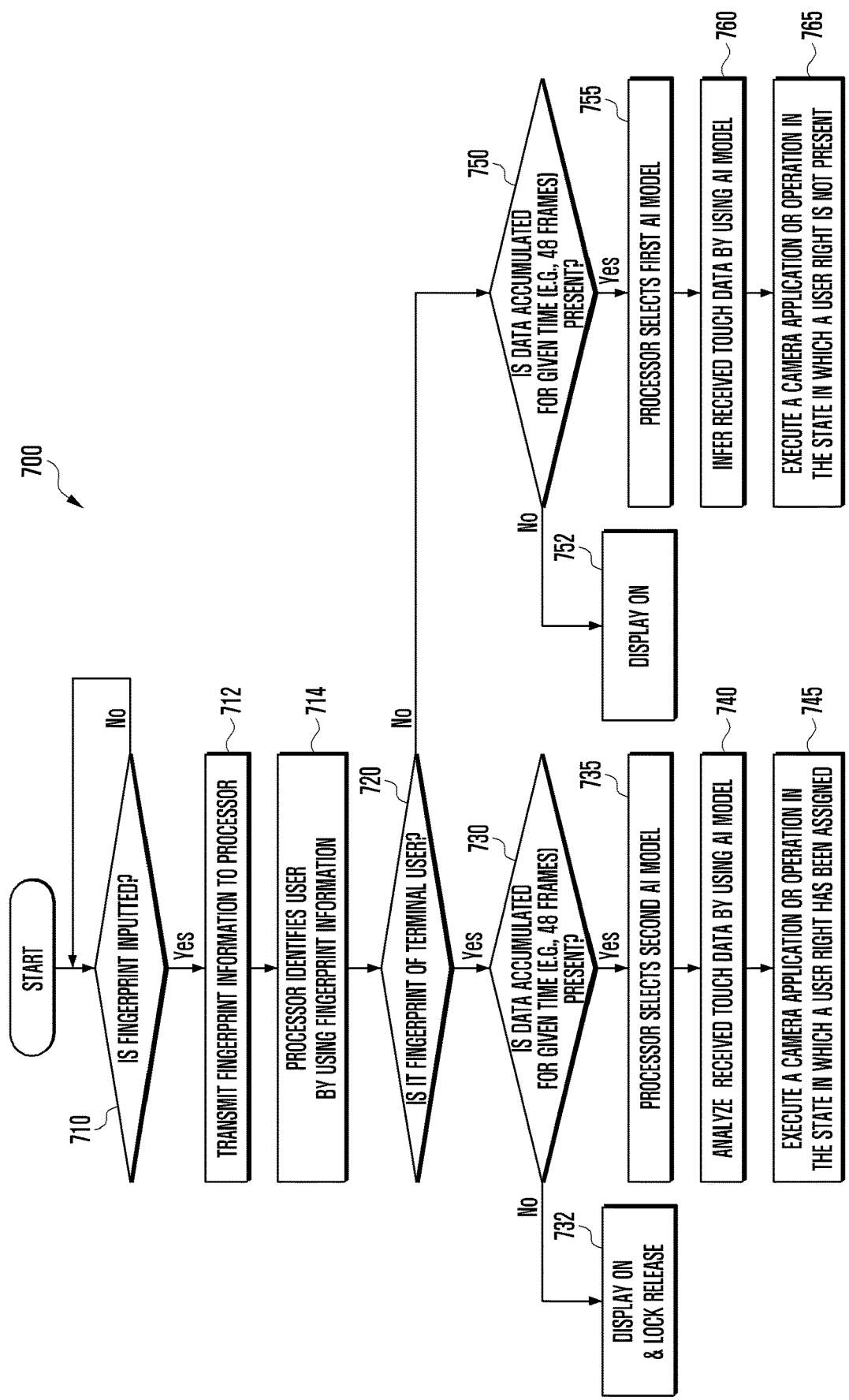
FIGS. 7A and 7B illustrate flowcharts of a method of recognizing, by an example electronic device, a force touch according to various embodiments.
Figure 7B:
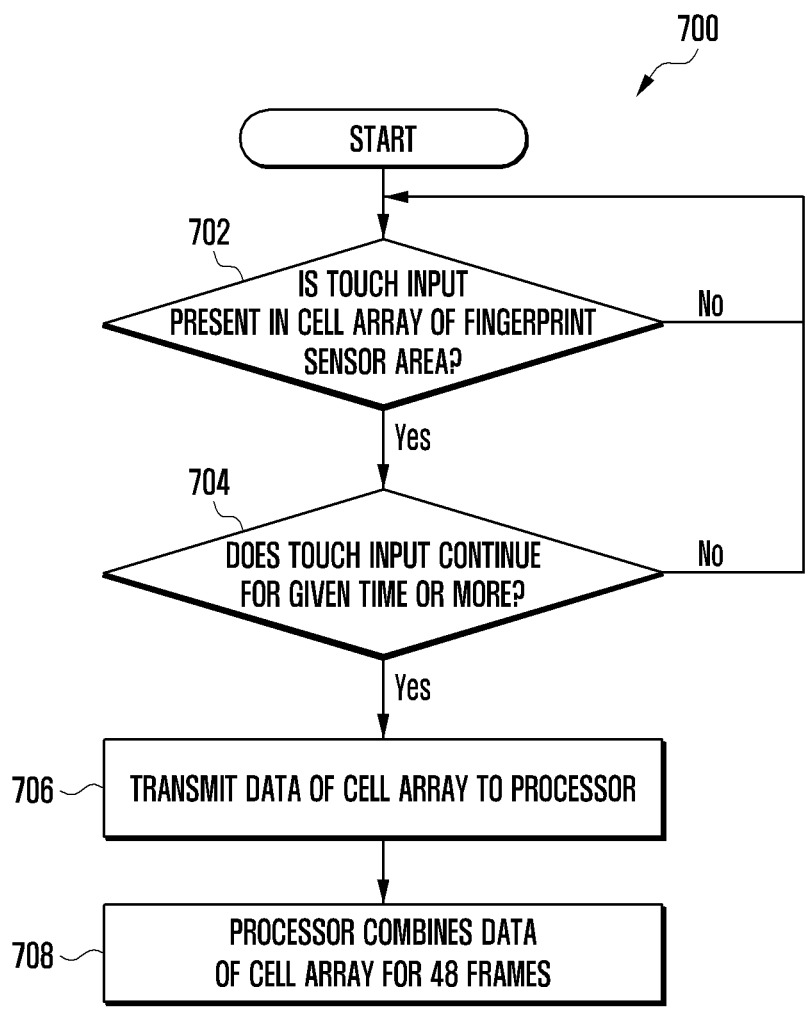

FIGS. 7A and 7B illustrate flowcharts of a method of recognizing, by an example electronic device, a force touch according to various embodiments.

Operations described with reference to FIGS. 7A and 7B may be implemented based on instructions which may, for example, be stored in a computer recording medium or a memory (the memory 350 in FIG. 3).

An illustrated method 700 may be executed by an electronic device (e.g., the electronic device 300 in FIG. 3) described above with reference to FIGS. 1 to 6. The aforementioned technical characteristics are hereinafter omitted.

In operation 710, a fingerprint sensor (e.g., the fingerprint sensor 320 in FIG. 3) of the electronic device 300 may recognize a touch input of a user and a fingerprint input situation. According to an embodiment, the fingerprint sensor 320 may be activated when a fingerprint recognition function is activated, for example, when an unlocking operation or an application for which security has been configured, such as a message application, is executed. According to an embodiment, the fingerprint sensor 320 may be activated when the fingerprint recognition function is activated and a touch input is generated in an area of the fingerprint sensor 320.

Based on a fingerprint being inputted, in operation 712, the fingerprint sensor 320 may transmit the recognized fingerprint information to a processor (e.g., the processor 340 in FIG. 3). The fingerprint information obtained by the fingerprint sensor 320 may be stored as image information, and may be used for the authentication by the electronic device 300 through a comparison with pre-registered fingerprint information. In operation 714, the processor 340 may determine whether the recognized fingerprint corresponds to (e.g., is identical to) the fingerprint of the user using the fingerprint information obtained by the fingerprint sensor 320. For example, "identical" may refer to a similarity between the pre-registered fingerprint information and the recognized fingerprint being greater than a similarity threshold.

In operation 720, when the registered fingerprint of the user and the inputted fingerprint correspond to each other based on a result of the fingerprint recognition, the processor 340 may determine that the registered fingerprint of the user has been inputted and the process proceeds to operation 730. Otherwise, the process proceeds to operation 750.

According to an embodiment, the touch sensor 330 may accumulate location data of a cell array in a frame unit (e.g., an N frame for t seconds) generated for a given time, and may transmit the location data to the processor 340. The processor 340 may receive, from a touch sensor (e.g., the touch sensor 330 in FIG. 3), first data in which the location data of the cell array has been accumulated and combined in a frame unit (e.g., an N frame for t seconds) generated for the given time. The first data may refer, for example, to data generated by accumulating the touch input detected by a touch sensor (e.g., the touch sensor 330 in FIG. 3) for the given time. Furthermore, the first data may include at least any one of a time, strength, pressure, intensity, and a touch form of the touch input.

In operation 730, the processor 340 may determine whether first data accumulated and combined for a given time (e.g., an N frame(s) or 48 frames) is present. When first data accumulated and combined for a given time (e.g., an N frame or 48 frames) is not present, the processor 340 may determine that a type of the touch input is not a long touch input or a force touch input. In this case, the processor 340 may determine that the touch input is for fingerprint recognition. Furthermore, since the inputted fingerprint has been determined as the registered fingerprint of the user in operation 720, in operation 732, the processor 340 may operate a display (e.g., the display 310 in FIG. 3), and may release the lock or security of the electronic device 300. Alternatively, in operation 732, the processor 340 may operate an always on display (AOD). The AOD may refer, for example, to a construction or function in which a date, a time, the amount of battery remaining, notification(s), etc. continue to be displayed on the display, even in the state in which a display screen has been turned off. In a case in which first data accumulated and combined for a given time (e.g., an N frame(s) or 48 frames) is present, in operation 735, the processor may select a user-tailored AI model (e.g., the user-tailored AI model 520 in FIG. 5).

When the inputted touch is generated by a registered user, an AI model selection unit (e.g., the AI model selection unit 540 in FIG. 5) in the processor 340 may select the user-tailored (second) AI model 520. Thereafter, the processor 340 may load data related to the user-tailored AI model 520 from a memory (e.g., the memory 350 in FIG. 5). In operation 740, the processor 340 may analyze the first data received from the touch sensor 330 using the user-tailored AI model 520. The processor 340 may analyze the touch input based on the loaded data, and may determine whether a form of the touch input is a long touch input or a force touch input.

Thereafter, in operation 745, the processor 340 may perform a corresponding function and/or execute a corresponding user interface based on whether a form of the touch input is a long touch input or a force touch input. At this time, the processor 340 may determine that the inputted fingerprint corresponds to the fingerprint of the user, and may execute an application in the state in which a user right has been assigned. For example, the processor 340 may recognize the force touch input, may determine that the inputted fingerprint corresponds to the fingerprint of the user, and may execute a camera application in a state in which a user right has been assigned. In this case, since the user has a state in which a user right has been assigned, the processor 340 may recognize the access of the user to a gallery application, and may execute the gallery application.

When the registered fingerprint of the user and the inputted fingerprint do not correspond to each other based on a result of the fingerprint recognition in operation 720, the processor 340 may determine that the inputted fingerprint is not the registered fingerprint of the user and proceed to operation 750.

According to an embodiment, the touch sensor 330 may accumulate location data of a cell array in a frame unit (e.g., N frame(s) for t seconds) generated for a given time, and may transmit the location data to the processor 340. The processor 340 may receive, from the touch sensor 330, first data in which the location data of the cell array has been accumulated and combined in a frame unit (e.g., N frame(s) for t seconds) generated for a given time. The first data may mean data generated by accumulating the touch input detected by a touch sensor (e.g., the touch sensor 330 in FIG. 3) for a given time. Furthermore, the first data may include at least any one of a time, strength, pressure, intensity, and a touch form of the touch input.

In operation 750, the processor 340 may determine whether first data accumulated and combined for a given time (e.g., N frame(s) or 48 frames) is present. In case that first data accumulated and combined for a given time (e.g., N frame(s) or 48 frames) is not present, the processor 340 may determine that the type of touch input is not a long touch input or a force touch input. In this case, the processor 340 may determine that the touch input is for fingerprint recognition. Furthermore, since it has been determined that the inputted fingerprint is not the registered fingerprint of the user in operation 720, in operation 752, the processor 340 may operate the display 310. Alternatively, in operation 752, the processor 340 may operate an always on display (AOD). The AOD may refer, for example, to a construction or function in which a date, a time, the amount of battery remaining, notification, etc. continues to be displayed on the display even in a state in which a display screen has been turned off. Furthermore, the processor 340 may display, on the display 310, a guide screen including contents indicating that the fingerprints do not correspond to each other, without releasing a lock or security.

When first data accumulated and combined for a given time (e.g., N frame(s) or 48 frames) is present, in operation 755, the processor may select the common (first) AI model 510 (e.g., the common AI model 510 in FIG. 5).

When the inputted touch is generated by a registered user, the AI model selection unit 540 in the processor 340 may select the common AI model 510. Thereafter, the processor 340 may load data related to the common AI model 510 from the memory 350. Thereafter, in operation 760, the processor 340 may analyze the first data received from the touch sensor 330 using the common AI model 510. The processor 340 may analyze the touch input based on the loaded data, and may determine whether a form of the touch input is a long touch input or a force touch input.

Thereafter, in operation 765, the processor 340 may perform a corresponding function and/or execute a corresponding user interface based on whether a form of the touch input is a long touch input or a force touch input. At this time, the processor 340 may determine that the inputted fingerprint is not the fingerprint of the user, and may execute an application in a state in which a user right is not present. For example, the processor 340 may recognize the force touch input, may determine that the inputted fingerprint is not the fingerprint of the user, and may execute a camera application in the state in which a user right is not present. In this case, since the user has a state in which a user right is not present, the processor 340 may block the access of the user to a gallery application, and may display a guide screen for user authentication.

According to an embodiment, if it is determined that the form of the touch input is the force touch input, the electronic device 300 may display an interface (e.g., 412 in FIG. 4) capable of adjusting volume on the display 310. According to an embodiment, if it is determined that the form of the touch input is the force touch input, the electronic device 300 may display, on the display 310, a guide screen that inquires about security unlocking and an icon of an application(s) that is frequently used by the user with more than given frequency when the inputted fingerprint corresponds to the fingerprint of a user, and may display a guide indicating that the fingerprints do not correspond to each other and operate the display 310 when the inputted fingerprint does not correspond to the fingerprint of the user.

According to FIG. 7B, in operation 702, the processor 340 may determine whether a touch input is present in a cell array of a fingerprint sensor area using the fingerprint sensor 320. Thereafter, based on the touch input being present in the cell array of the fingerprint sensor area, in operation 704, the processor 340 may determine whether the touch input applied to the cell array of the fingerprint sensor area continues for a given time (e.g., N frame(s)) or more. According to an embodiment, in case in which the touch input continues for a given time (e.g., N frame(s)) or more, the processor 340 may classify a form of the touch input as a long touch input or a force touch input. The long touch input may refer, for example, to a situation in which pressure is applied to the touch sensor for more than a given time. Furthermore, the force touch input may refer, for example, to a situation in which pressure is strongly applied to the touch sensor at more than a given pressure level for more than a given time. Alternatively, when the touch input does not continue for a given time (e.g., an N frame) or more, the processor 340 may classify the touch input as a short touch input or a continuous touch input.

According to an embodiment, in operation 706, the touch sensor 330 may accumulate location data of the cell array on the display 310 to which the touch is inputted in a frame unit (e.g., N frame(s) for t seconds) generated for a given time, and may transmit the location data to the processor 340. In operation 708, the processor 340 may generate first data by accumulating and combining the location data of the cell array from a touch sensor (e.g., the touch sensor 330 in FIG. 3) in a frame unit (e.g., N frame(s) for t seconds) generated for a given time. Alternatively, the processor 340 may receive the first data in which the location data of the cell array has been accumulated and combined in a frame unit (e.g., N frame(s) for t seconds) generated for a given time. The first data may refer, for example, to data generated by accumulating the touch input detected by a touch sensor (e.g., the touch sensor 330 in FIG. 3) for the given time. Furthermore, the first data may include at least any one of a time, strength, pressure, intensity, and a touch form of the touch input.

Thereafter, in operation 730 or operation 750 of FIG. 7A, the processor 340 may determine whether first data in which the location data of the cell array has been accumulated and combined for a given time (e.g., 48 frames) is present based on a result of operation 708, and may execute a corresponding operation.

Figure 8:
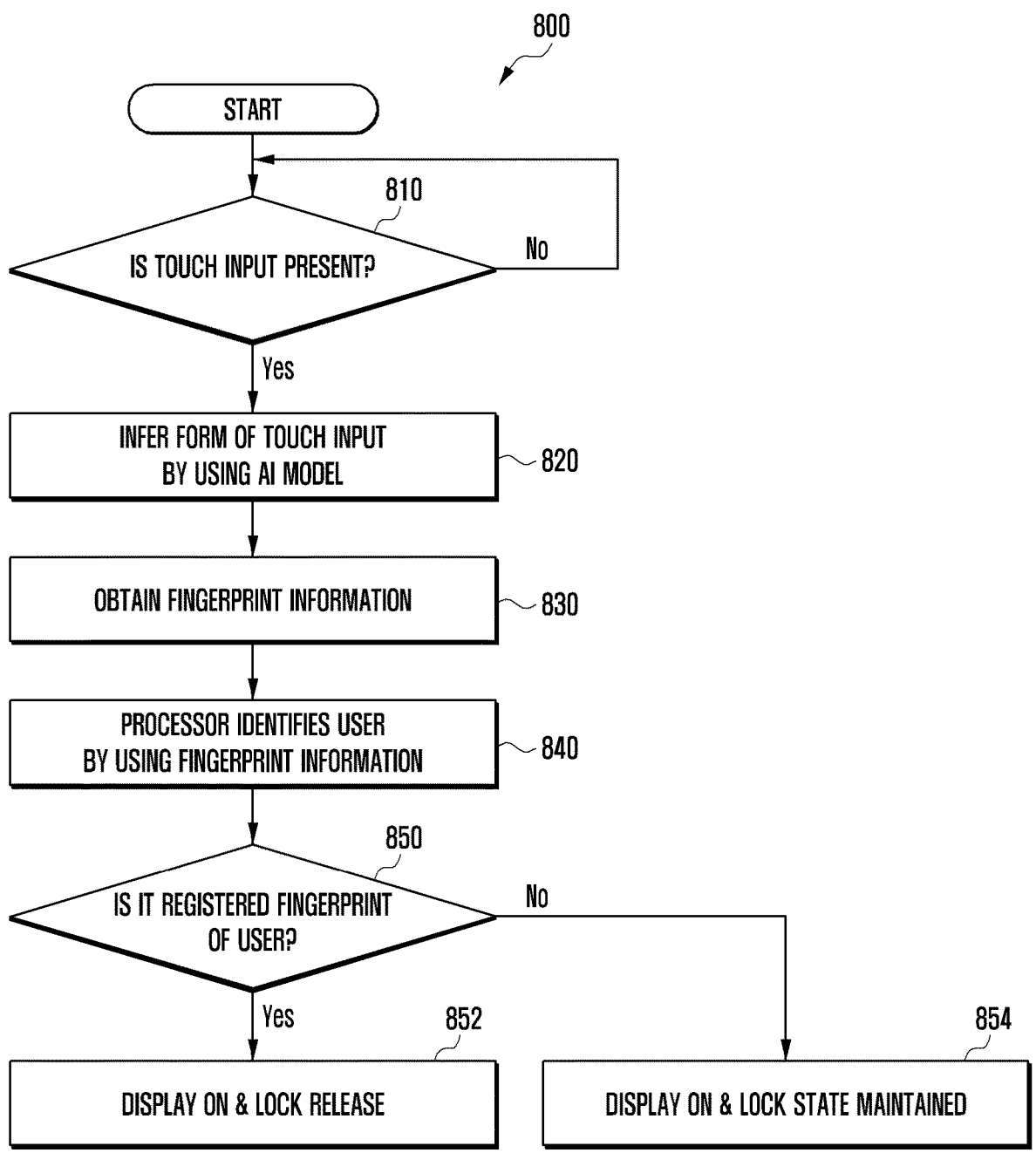
FIG. 8 illustrates a flowchart of a method of recognizing, by an example electronic device, a force touch according to various embodiments.

FIG. 8 illustrates a flowchart of a method of recognizing, by an example electronic device, a force touch according to various embodiments.

Operations described with reference to FIG. 8 may, for example, be implemented based on instructions which may be stored in a computer recording medium or a memory (the memory 350 in FIG. 3). An illustrated method 800 may be executed by an electronic device (e.g., the electronic device 300 in FIG. 3) described above with reference to FIGS. 1 to 6, and the aforementioned technical characteristics are hereinafter omitted.

In operation 810, a processor (e.g., the processor 340 in FIG. 3) may identify a touch input of a user using a touch sensor (e.g., the touch sensor 330 in FIG. 3). If the touch input is present, the processor 340 may infer an identified form of the touch input using an AI model, in operation 820. The form of the touch input may include at least any one of a long touch input in which the display is touched for an input time more than a given time, but with strength of an input less than a certain level or a force touch input in which the display is touched for an input time more than a given time and with strength of an input more than a certain level, for example. At this time, the processor 340 may recognize the touch input on a fingerprint recognition area using a fingerprint sensor (e.g., the fingerprint sensor 320 in FIG. 3) even in a state in which a screen of a display (e.g., the display 310 in FIG. 3) has been turned off.

The processor 340 may infer a form of the touch input, and may obtain fingerprint information based on the inputted touch using the fingerprint sensor 320 in operation 830. The fingerprint information may include a form of a fingerprint used for the touch input, for example. The processor 340 may obtain the fingerprint information, and may determine whether the touch input is a touch input by a registered user by comparing the obtained fingerprint with a registered fingerprint of the user in operation 840.

If the obtained fingerprint corresponds to the registered fingerprint, the processor 340 may recognize the touch input by the registered user, and may release the security and lock of the electronic device 300 and operate the display in operation 852. Alternatively, the processor 340 may recognize the touch input by the registered user, and may release the security and lock of the electronic device 300 and operate an always on display (AOD) in operation 852. The AOD may refer, for example, to a construction or function in which a date, a time, the amount of battery remaining, notification, etc. continue to be displayed on the display even in a state in which a display screen has been turned off.

Based on the obtained fingerprint not corresponding to the registered fingerprint (e.g., the fingerprint is not for a registered user), the processor 340 may operate the display in a state in which the security and lock of the electronic device 300 are maintained in operation 854. Alternatively, the processor 340 may recognize the touch input by another user not the registered user, and may operate an always on display (AOD) in a state in which the security and lock of the electronic device 300 are maintained in operation 854.

Figure 9:
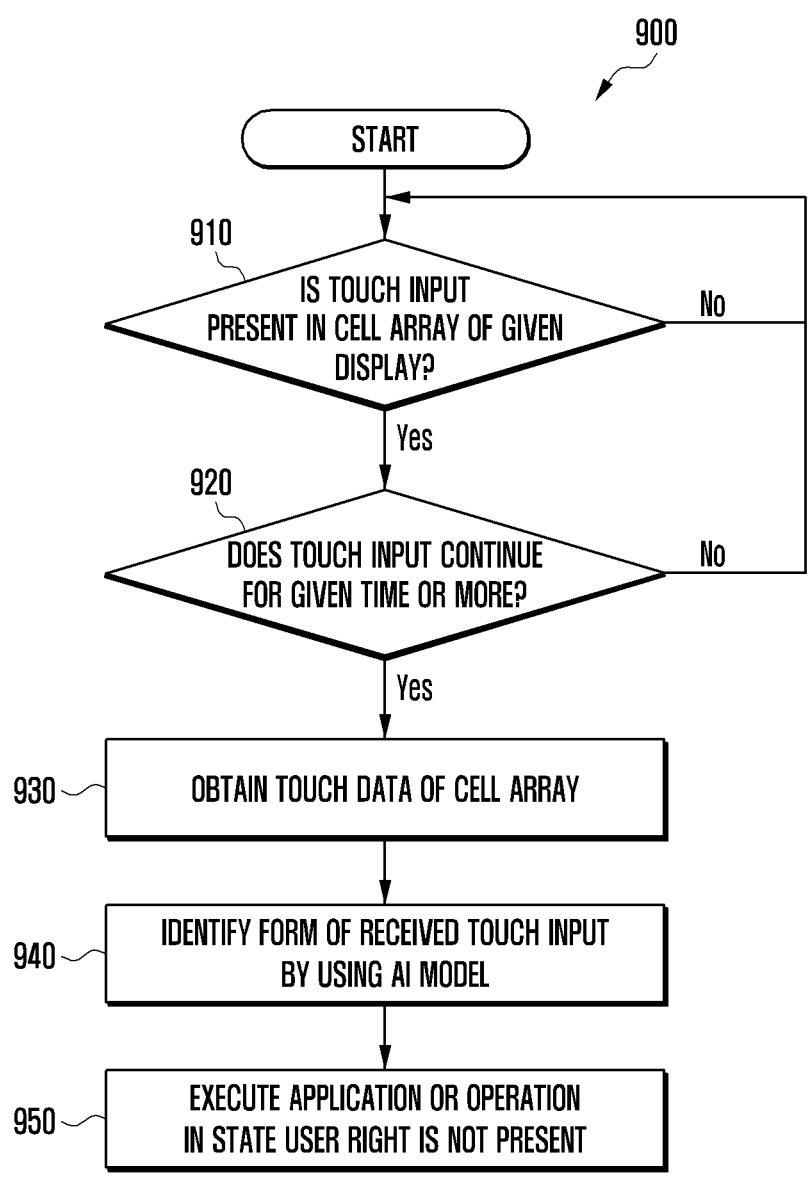
FIG. 9 illustrates a flowchart of a method of recognizing, by an example electronic device, a force touch according to various embodiments.

FIG. 9 illustrates a flowchart of a method of recognizing, by an example electronic device, a force touch according to various embodiments.

Operations described with reference to FIG. 9 may, for example, be implemented based on instructions which may be stored in a computer recording medium or a memory (the memory 350 in FIG. 3). An illustrated method 900 may be executed by an electronic device (e.g., the electronic device 300 in FIG. 3) described above with reference to FIGS. 1 to 6, and the aforementioned technical characteristic are hereinafter omitted.

According to FIG. 9, in operation 910, the processor 340 may determine whether a touch input is present in a cell array of a given area on the display. If the touch input is present, the processor 340 may determine whether the touch input applied to the cell array continues for a given time (e.g., N frame(s)) or more, in operation 920. According to an embodiment, when the touch input continues for a given time (e.g., N frame(s)) or more, the processor 340 may classify a form of the touch input as a long touch input or a force touch input. The long touch input may refer, for example, to a situation in which pressure is applied to the touch sensor for more than a given time. Furthermore, the force touch input may refer, for example, to a situation in which pressure is strongly applied to the touch sensor at more than a given pressure level for more than a given time. Alternatively, when the touch input does not continue for a given time (e.g., an N frame) or more, the processor 340 may classify the touch input as a short touch input or a continuous touch input.

Based on the processor 340 identifying identify that the touch input applied to the cell array continues for a given time (e.g., N frame(s)) or more, the processor 340 may obtain touch data on the cell array, in operation 930. The touch data may include at least any one of a location of the cell array to which the touch input has been applied or a form of the touch input, for example.

The processor 340 may obtain the touch data, and may infer an identified form of the touch input using an AI model, in operation 940. The form of the touch input may include at least any one of a long touch input in which the display is touched for an input time more than a given time, but with strength of an input less than a certain level, or a force touch input in which the display is touched for an input time more than a given time and with strength of an input more than a certain level, for example. At this time, the processor 340 may recognize the touch input in a fingerprint recognition area using a touch sensor (e.g., the touch sensor 330 in FIG. 3) even in a state in which a screen of a display (e.g., the display 310 in FIG. 3) has been turned off.

The processor 340 may identify the form of the touch input, and may execute an application or operation corresponding to the touch input in a state in which a user right is not present in operation 950. For example, the processor 340 may identify a force touch input, and may execute a camera application in a state in which a user right is not present. In this case, since the user has a state in which a user right is not present, the processor 340 may block access of the user to a gallery application, and may display a guide screen for user authentication. According to an embodiment, the processor 340 may identify a force touch input, and may control a specific application to be executed. For example, the processor 340 may control at least any one of a camera application, a gallery application, a pay application, a note application, or a voice assistant application to be executed after recognizing a force touch input. Alternatively, the processor 340 may control the display 310 to be expanded or reduced after recognizing a force touch input even in a state in which a screen of the display 310 has been turned off. The type of application or operation which may be executed by the electronic device 300 after recognizing a force touch input may not be limited thereto.

According to various embodiments, a method of recognizing a force touch, by an electronic device (e.g., the electronic device 300 in FIG. 3), may include determining whether a touch input is generated in a fingerprint recognition area in which a fingerprint sensor (e.g., the fingerprint sensor 320 in FIG. 3) is disposed using a touch sensor (e.g., the touch sensor 330 in FIG. 3), determining whether the generated touch input continues for a given time or more and generating first data by accumulating the touch input generated for the corresponding time when the touch input continues for the given time or more, determining whether an inputted fingerprint corresponds to a registered fingerprint of a user by analyzing the touch input in the fingerprint recognition area using the fingerprint sensor 320, analyzing the first data using a first AI model when the inputted fingerprint corresponds to the fingerprint of the user and analyzing the first data using a second AI model when the inputted fingerprint does not correspond to the fingerprint of the user, and identifying a form of the touch input based on a result of analysis of the first data and performing a function corresponding to the form of the touch input and/or executing a user interface corresponding to the form of the touch input. The first AI model includes a user-tailored AI model. The second AI model includes a common (e.g., common to multiple users) AI model. The first data may include at least any one of whether the touch input is generated, duration of the touch input, or a location of a display to which the touch input has been applied.

According to an embodiment, the form of the touch input may include a long touch input in which the display is touched for an input time more than a given time, but with strength of an input less than a certain level, and a force touch input in which the display is touched for an input time more than a given time and with strength of an input more than a certain level.

According to an embodiment, the electronic device may recognize the force touch input only in the fingerprint recognition area in which the fingerprint sensor is disposed.

According to an embodiment, identifying a form of the touch input based on a result of analysis of the first data and performing a function corresponding to the form of the touch input and/or executing a user interface corresponding to the form of the touch input may further include, if it is determined that the form of the touch input is the long touch input, releasing a security lock and operating the display when the inputted fingerprint corresponds to the fingerprint of the user, and displaying a guide indicating that the fingerprints do not correspond to each other and operating the display when the inputted fingerprint does not correspond to the fingerprint of the user.

According to an embodiment, identifying a form of the touch input based on a result of analysis of the first data and performing a function corresponding to the form of the touch input and/or executing a user interface corresponding to the form of the touch input may further include, if it is determined that the form of the touch input is the force touch input, displaying, on the display, at least any one of a guide screen inquiring about security unlocking, an icon of an application(s) frequently used by the user with more than given frequency, or an icon of an application(s) configured by the user when the inputted fingerprint corresponds to the fingerprint of the user, and displaying a guide indicating that the fingerprints do not correspond to each other and operating the display when the inputted fingerprint does not correspond to the fingerprint of the user.

According to an embodiment, identifying a form of the touch input based on a result of analysis of the first data and performing a function corresponding to the form of the touch input and/or executing a user interface corresponding to the form of the touch input may further include displaying, on the display, an interface capable of adjusting volume, if it is determined that the form of the touch input is the force touch input.

According to an embodiment, the first AI model may determine whether the touch input is a touch input of a registered user of the electronic device using the fingerprint sensor, may store, in the memory, data related to the touch input of the registered user when the touch input corresponds to the touch input of the registered user, and may learn a registered user pattern including at least any one of strength, a touch form, or a touched range upon touch input of the configured user using the stored data.

According to an embodiment, the second AI model may determine whether the touch input is a touch input of a registered user of the electronic device using the fingerprint sensor, may classify the touch input as a touch input of a common user in a case in which the touch input is not the touch input of a registered user, may store, in the memory, data related to the touch input of the common user, and may learn a common user pattern including at least any one of strength, a touch form, or a touched range upon touch input of the common user using the stored data.

According to an embodiment, the touch sensor may generate location data including transverse and longitudinal locations of a cell to which a touch input is applied when a touch is inputted to a cell array of the touch sensor.

According to an embodiment, the first data may include data generated by accumulating location data generated by the touch sensor for a given time for which the touch input is applied. The touch sensor may transmit the first data to the processor.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a fingerprint sensor;
a touch sensor;
a memory storing at least one instruction; and
a processor operatively connected to the fingerprint sensor, the touch sensor, and the memory,
wherein the processor is configured to:
determine whether a touch input is generated in a fingerprint recognition area in which the fingerprint sensor is disposed, using the touch sensor,
determine whether the generated touch input continues for a given time or more,
generate first data by accumulating the touch input generated based on the touch input continuing for the given time or more,
determine whether an inputted fingerprint corresponds to a registered fingerprint of a registered user by analyzing the touch input in the fingerprint recognition area, using the fingerprint sensor,
analyze the first data using a first artificial intelligence (AI) model based on the inputted fingerprint corresponding to the registered fingerprint,
analyze the first data using a second AI model based on the inputted fingerprint not corresponding to the registered fingerprint,
identify a form of the touch input based on analysis of the first data, and
perform a function corresponding to the identified form of the touch input and/or execute a user interface corresponding to the identified form of the touch input,
wherein
the first AI model comprises a user-tailored AI model,
the second AI model comprises a common AI model, and
the first data comprises at least any one of whether the touch input is generated, duration of the touch input, or a location on a display to which the touch input is applied.

2. The electronic device of claim 1, wherein the form of the touch input comprises:
a long touch input in which the display is touched for an input time more than a first time, but with an input strength less than a first level; or
a force touch input in which the display is touched for an input time more than a second time and with an input strength more than a second level.

3. The electronic device of claim 2, wherein the processor is configured to recognize the force touch input only in the fingerprint recognition area in which the fingerprint sensor is disposed.

4. The electronic device of claim 2, wherein the processor is configured to:
based on the touch input being the long touch input,
release a security lock and operate the display, based on the inputted fingerprint corresponding to the registered fingerprint, and
display a guide indicating that the inputted fingerprint and the registered fingerprint do not correspond with each other and operate the display, based on the inputted fingerprint not corresponding to the registered fingerprint.

5. The electronic device of claim 2, wherein the processor is configured to:
based on the touch input being the force touch input,
display, on the display, at least any one of a guide screen inquiring about security unlocking, an icon of an application frequently used by the user with more than given frequency, or an icon of an application configured by the user, based on the inputted fingerprint corresponding to the registered fingerprint, and
display a guide indicating that the inputted fingerprint and the registered fingerprint do not correspond to each other and operate the display, based on the inputted fingerprint not corresponding to the registered fingerprint.

6. The electronic device of claim 2, wherein the processor is configured to display, on the display, an interface capable of adjusting volume based on the touch input being the force touch input.

7. The electronic device of claim 1, wherein the first AI model is configured to:
determine whether the touch input is a touch input of a registered user of the electronic device using the fingerprint sensor,
store, in the memory, data related to the touch input of the registered user, based on the touch input corresponding to the touch input of the registered user, and
learn a registered user pattern comprising at least any one of strength, a touch form, or a touched range upon a touch input of the registered user, using the stored data.

8. The electronic device of claim 1, wherein the second AI model is configured to:
determine whether the touch input is a touch input of a registered user of the electronic device using the fingerprint sensor,
classify the touch input as a touch input of a common user based on the touch input not being the touch input of the registered user,
store, in the memory, data related to the touch input of the common user, and
learn a common user pattern comprising at least any one of strength, a touch form, or a touched range upon a touch input of the common user, using the stored data.

9. The electronic device of claim 1, wherein:
the touch sensor is configured to generate location data comprising transverse and longitudinal locations of a cell to which a touch input is applied, based on the touch input being inputted to a cell array of the touch sensor, and
the first data comprises data generated by accumulating the location data for a time for which the touch input is applied.

10. The electronic device of claim 9, wherein the processor is configured to receive the first data from the touch sensor.

11. A method of recognizing, by an electronic device, a force touch, the method comprising:
determining whether a touch input is generated in a fingerprint recognition area in which a fingerprint sensor is disposed, using a touch sensor;
determining whether the generated touch input continues for a first time or more;
generating first data by accumulating the touch input generated based on the touch input continuing for the first time or more;
determining whether an inputted fingerprint corresponds to a registered fingerprint of a registered user of the electronic device by analyzing the touch input in the fingerprint recognition area, using the fingerprint sensor;

analyzing the first data using a first artificial intelligence (AI) model, based on the inputted fingerprint corresponding to the registered fingerprint;

analyzing the first data using a second AI model, based on the inputted fingerprint not corresponding to the registered fingerprint;

identifying a form of the touch input based on analysis of the first data; and performing a function corresponding to the identified form of the touch input and/or executing a user interface corresponding to the identified form of the touch input, wherein
the first AI model comprises a user-tailored AI model,
the second AI model comprises a common AI model, and
the first data comprises at least any one of whether the touch input is generated, duration of the touch input, or a location on a display to which the touch input is applied.

12. The method of claim 11, wherein the form of the touch input comprises:
a long touch input in which the display is touched for an input time more than a first time, but with an input strength less than a first level; or
a force touch input in which the display is touched for an input time more than a second time and with an input strength more than a second level.

13. The method of claim 12, wherein the force touch input is recognized only in the fingerprint recognition area in which the fingerprint sensor is disposed.

14. The method of claim 12, wherein identifying a form of the touch input based on analysis of the first data and performing a function corresponding to the identified form of the touch input and/or executing a user interface corresponding to the identified form of the touch input further comprises:
based on the touch input being the long touch input,
releasing a security lock and operating the display, based on the inputted fingerprint corresponding to the registered fingerprint, and
displaying a guide indicating that the inputted fingerprint and the registered fingerprint are not corresponding to each other and operating the display, based on the inputted fingerprint not corresponding to the registered fingerprint.

15. The method of claim 12, wherein identifying a form of the touch input based on analysis of the first data and performing a function corresponding to the identified form of the touch input and/or executing a user interface corresponding to the identified form of the touch input further comprises:
based on the touch input being the force touch input,
displaying, on the display, at least any one of a guide screen inquiring about security unlocking, an icon of an application frequently used by the user with more than given frequency, or an icon of an application configured by the user, based on the inputted fingerprint corresponding to the registered fingerprint, and
displaying a guide indicating that the inputted fingerprint and the registered fingerprint do not correspond to each other and operating the display, based on the inputted fingerprint not corresponding to the registered fingerprint.

16. The method of claim 12, wherein identifying a form of the touch input based on analysis of the first data and performing a function corresponding to the identified form of the touch input and/or executing a user interface corresponding to the identified form of the touch input further comprises displaying, on the display, an interface capable of adjusting volume based on the touch input being the force touch input.

17. The method of claim 11, wherein the first AI model is configured to:
determine whether the touch input is a touch input of a registered user of the electronic device, using the fingerprint sensor,
store, in the memory, data related to the touch input of the registered user based on the touch input corresponding to the touch input of the registered user, and
learn a registered user pattern comprising at least any one of strength, a touch form, or a touched range upon a touch input of the registered user, using the stored data.

18. The method of claim 11, wherein the second AI model is configured to:
determine whether the touch input is a touch input of a registered user of the electronic device, using the fingerprint sensor,
classify the touch input as a touch input of a common user based on the touch input not corresponding to the touch input of the registered user,
store, in the memory, data related to the touch input of the common user, and
learn a common user pattern comprising at least any one of strength, a touch form, or a touched range upon a touch input of the common user using the stored data.

19. The method of claim 11, further comprising:
generating location data comprising transverse and longitudinal locations of a cell to which a touch input is applied, based on the touch input being inputted to a cell array of the touch sensor.

20. The method of claim 19, further comprising:
generating data by accumulating location data generated by the touch sensor for a time for which the touch input is applied, and
transmitting the first data to the processor.

* * * * *